United States Patent [19]

Yanagisawa et al.

[11] Patent Number: 5,326,679
[45] Date of Patent: Jul. 5, 1994

[54] RECORDING MEDIUM

[75] Inventors: Shuichi Yanagisawa; Atsushi Yoshizawa; Tatsuro Sakai; Satoru Tanaka; Makoto Okano; Takashi Chuman; Yasushi Araki; Taishi Tsuji; Fumio Matsui, all of Saitama, Japan

[73] Assignee: Pioneer Electronic Corporation, Tokyo, Japan

[21] Appl. No.: 68,577

[22] Filed: May 27, 1993

Related U.S. Application Data

[63] Continuation of Ser. No. 877,418, Apr. 30, 1992, abandoned.

[30] Foreign Application Priority Data

Aug. 20, 1991 [JP]  Japan ................. 3-208003
Sep. 25, 1991 [JP]  Japan ................. 3-245889

[51] Int. Cl.$^5$ .................. G03C 1/72; G11B 7/007
[52] U.S. Cl. ...................... 430/495; 430/945; 346/135.1; 369/288; 369/284; 369/275.4
[58] Field of Search .................. 430/495, 945; 346/135.1; 369/280, 284, 288, 275.4

[56] References Cited

U.S. PATENT DOCUMENTS

| | | | |
|---|---|---|---|
| 4,412,231 | 10/1983 | Namba et al. | 346/135.1 |
| 4,600,625 | 7/1986 | Abe et al. | 346/135.1 |
| 4,734,904 | 3/1989 | Imanaka et al. | 369/275.4 |
| 4,735,889 | 4/1989 | Namba et al. | 430/945 |
| 4,944,967 | 7/1990 | Yabe et al. | 430/495 |
| 4,977,064 | 12/1990 | Sukawa et al. | 430/945 |
| 4,999,281 | 3/1991 | Inagaki et al. | 430/495 |
| 5,079,135 | 1/1992 | Matsuzawa et al. | 346/135.1 |
| 5,080,946 | 4/1992 | Takagisi et al. | 369/286 |
| 5,122,435 | 6/1992 | Schmitt et al. | 430/945 |
| 5,155,008 | 10/1992 | Yanagisawa et al. | 346/135.1 |
| 5,155,009 | 10/1992 | Yanagisawa et al. | 430/945 |

FOREIGN PATENT DOCUMENTS

| | | |
|---|---|---|
| 0396040 | 11/1990 | European Pat. Off. |
| 3636959 | 5/1987 | Fed. Rep. of Germany ...... 430/495 |
| 4023984 | 5/1991 | Fed. Rep. of Germany . |
| 4027172 | 7/1991 | Fed. Rep. of Germany . |
| 62-229548 | 10/1977 | Japan ................. 369/275.4 |
| 56-80491 | 7/1981 | Japan ................. 346/135.1 |
| 60-259498 | 12/1985 | Japan ................. 346/135.1 |
| 61-175085 | 8/1986 | Japan ................. 346/135.1 |

OTHER PUBLICATIONS

Patent Abstracts of Japan, vol. 10, No. 322 (P-511)(2378) Oct. 31, 1986 & JP-A-61 129 747 (TDK Corp.) Jun. 17, 1986.

Patent Abstracts of Japan, vol. 10, No. 68 (P-437)(2125) Mar. 18, 1986 & JP-A-60 205 841 (TDK) Oct. 17, 1985.

*Primary Examiner*—Charles L. Bowers, Jr.
*Assistant Examiner*—Martin J. Angebranudt
*Attorney, Agent, or Firm*—Sughrue, Mion, Zinn, Macpeak & Seas

[57] ABSTRACT

A writable recording medium having reduced jitter, improved performance on repeated reproduction, improved light resistance, and sensitivity controllability is disclosed, in which a light-absorbing layer thereof contains (D-1) a cyanine dye having an absorption band in the wavelength region of light for recording or reproduction, (D-2) a cyanine dye having an absorption band in a shorter wavelength region than that of cyanine dye (D-1) and having a smaller absorption than that of cyanine dye (D-1) in the wavelength region of light for recording or reproduction, (Q-1) a quencher for preventing photo-deterioration of cyanine dyes, and (Q-2) a quencher selected from an azo compound and a diphenylamine compound, the weight ratio of cyanine dye (D-2) to cyanine dye (D-1), taken as $\alpha$, being from 1 to 3, the weight ratio of quencher (Q-1) to quencher (Q-2), taken as $\beta$, being from 0.5 to 1, the ratio of the total weight of quenchers (Q-1) and (Q-2) to the total weight of cyanine dyes (D-1) and (D-2), taken as $\gamma$, being from 0.25 to 0.5, and the product of $\alpha$ by $\gamma$ ($\alpha \bullet \gamma$) being less than 1.1.

2 Claims, 19 Drawing Sheets

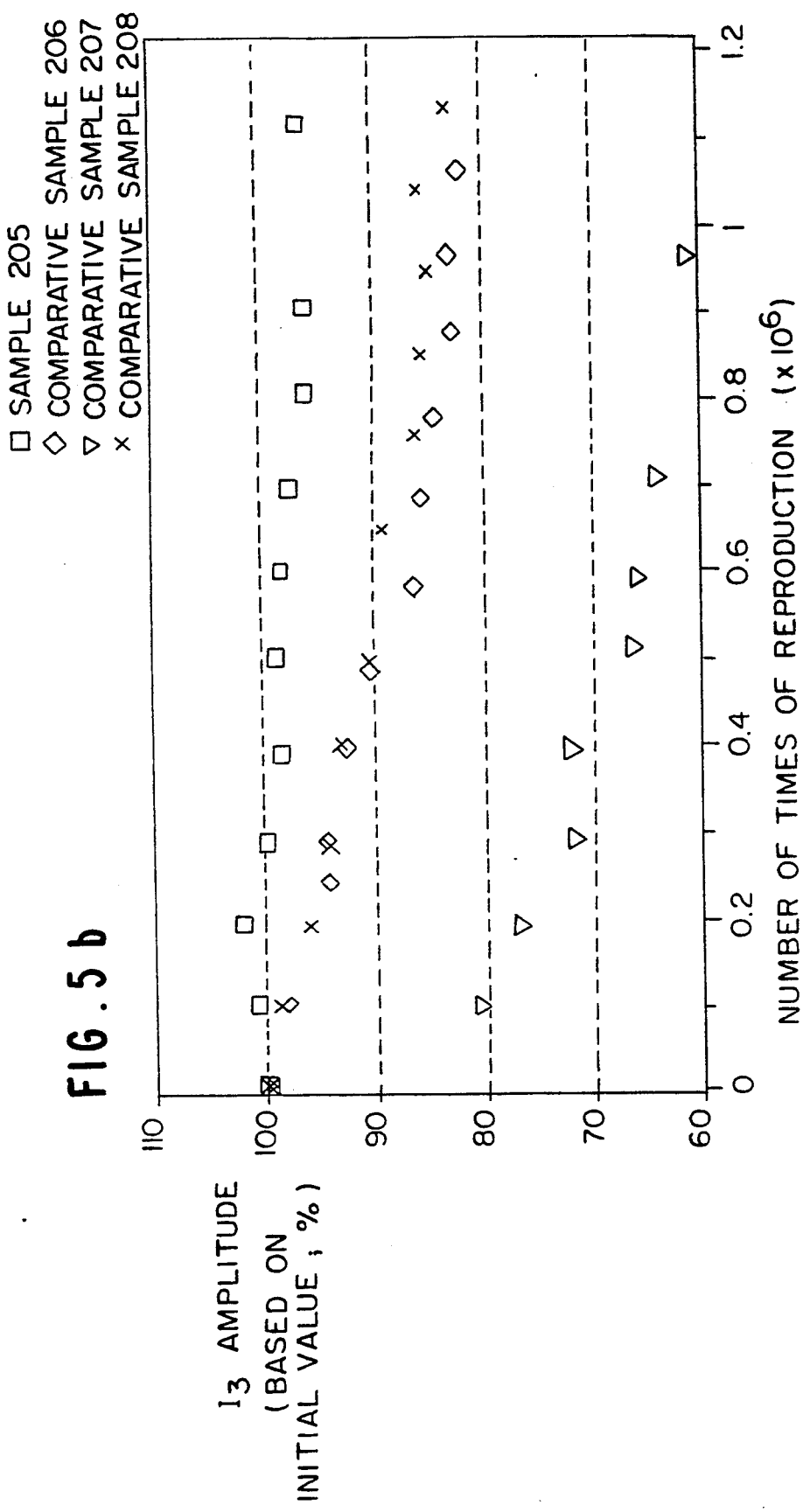

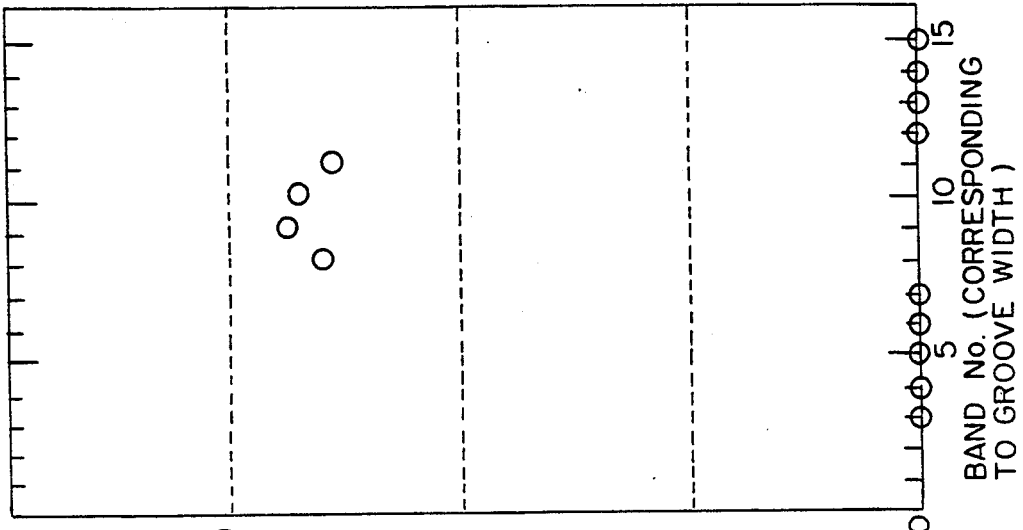
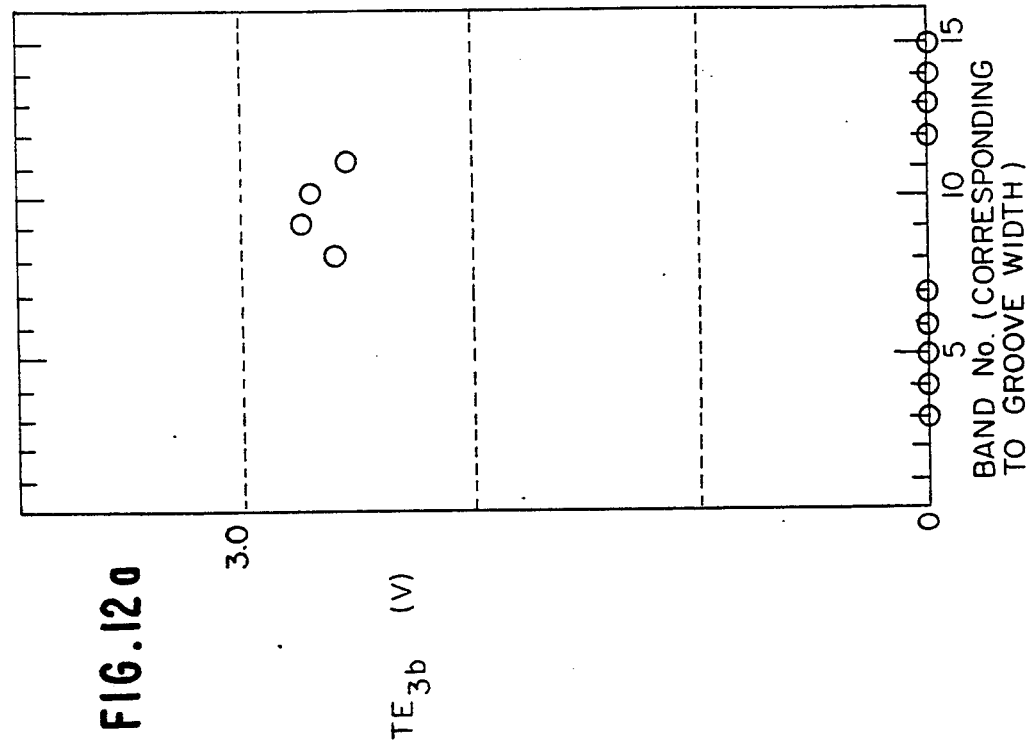

5,326,679

RECORDING MEDIUM

This is a continuation of application Ser. No. 07/877,418 filed Apr. 30, 1992, now abandoned.

FIELD OF THE INVENTION

This invention relates to a writable recording medium and more particularly to a writable laser disc comprising a light-transmitting substrate having provided thereon a light-absorbing layer and a light-reflecting layer.

BACKGROUND OF THE INVENTION

It is generally well-known to use organic dyestuffs, such as cyanine dyes and phthalocyanine pigments, in a recording layer of so-called writable recording media.

Recording systems of these recording media consist of applying a condensed laser beam on a very small area of a recording layer and converting the laser beam to a heat energy to change the properties of the recording layer (pit formation). For smooth change of the recording layer properties, generally spread media has a so-called air-sandwiched structure composed of a pair of substrates each having formed thereon a recording layer with the recording layers facing to each other. Recording of information on this type of recording media is carried out by irradiating a laser beam from the transparent substrate side to form optically readable pits in the recording layer. For reading, i.e., reproduction, of the recorded information, a laser beam having a weaker output than that for recording is irradiated on the recording layer to make a contrast between the pitted area and the non-pitted area, and the contrast is read out as electrical signals.

On the other hand, read-only-memory (ROM) type recording media having previously recorded information have been widely put to practical use in the field of audio recording and information processing. This type of recording media have no writable recording layer as used in the above-described writable recording media. That is, the ROM type recording media comprise a plastic substrate having previously formed thereon prepits by press forming, a reflective layer comprising a metal, e.g., Au, Ag, Cu, and Al, and a protective layer in this order. Such ROM type recording media are typically represented by compact discs (CD). The recording and reproduction signals on CD are standardized, and reproducing apparatus, called CD players, according to the standards are widely popular.

The above-mentioned writable recording media are similar to CD in use of a laser beam as a light source and in disc form. Hence, it has been keenly demanded to develop a writable recording medium which follows the standards of CD and can therefore be applied to a CD player. Several samples have been proposed to date to meet this demand. While the proposed samples conform to the standards as far as their initial characteristics are concerned, they turned out disadvantageous in that (1) they suffer from considerable jitter, (2) they are poor in duration of performance on repeated reproduction, (3) the recording layer has no light resistance, and (4) the recording sensitivity is uncontrollable.

SUMMARY OF THE INVENTION

An object of the present invention is to provide a writable recording medium having reduced jitter, improved durability against repeated reproduction, improved light resistance, and controllability of recording sensitivity.

It has now been found that the above object of the present invention is accomplished by a recording medium comprising a light-transmitting substrate having formed on one side thereof pregrooves, a light-absorbing layer provided on the pregrooved side of said substrate, and a light-reflecting layer provided on said light-absorbing layer, in which said light-absorbing layer contains (D-1) a cyanine dye having an absorption band in the wavelength region of light for recording or reproduction, (D-2) a cyanine dye having an absorption band in a shorter wavelength region than that of cyanine dye (D-1) and having a smaller absorption than that of cyanine dye (D-1) in the wavelength region of light for recording or reproduction, (Q-1) a quencher for preventing photo-deterioration of cyanine dyes, and (Q-2) a quencher selected from an azo compound and a diphenylamine compound, the weight ratio of cyanine dye (D-2) to cyanine dye (D-1), taken as $\alpha$, being from 1 to 3, the weight ratio of quencher (Q-1) to quencher (Q-2), taken as $\beta$, being from 0.5 to 1, the ratio of the total weight of quenchers (Q-1) and (Q-2) to the total weight of cyanine dyes (D-1) and (D-2), taken as $\gamma$, being from 0.25 to 0.5, and the product of $\alpha$ by $\gamma$ (i.e., $\alpha \bullet \gamma$) being less than 1.1.

BRIEF DESCRIPTION OF THE DRAWING

FIGS. 5a and 5b are plots of change of $I_3$ (% based on initial value) vs. number of times of reproduction.

FIGS. 12a and 12b are plots of $TE_{3b}$ vs. pregroove width.

DETAILED DESCRIPTION OF THE INVENTION

Figure 1:
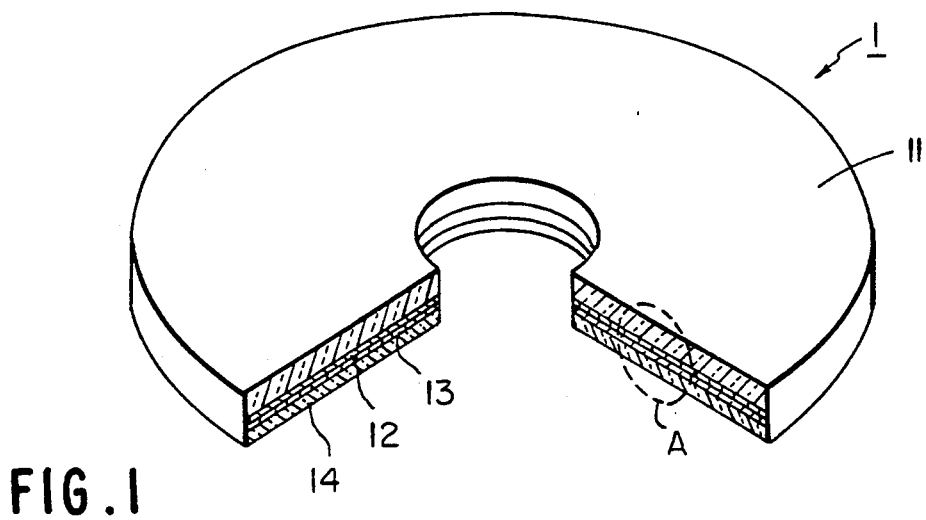
FIG. 1 is a perspective cutaway view of the optical recording medium according to the present invention.
Figure 2:
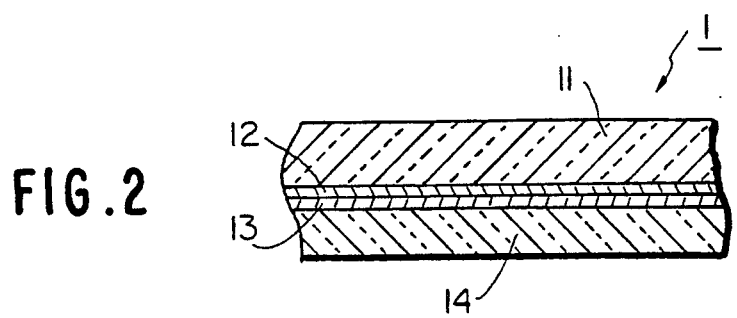
FIG. 2 is a partial cross section of the optical recording medium of FIG. 1.

As shown in FIG. 1, the recording medium of the present invention comprises light-transmitting substrate 11 having provided thereon light-absorbing layer 12, light-reflecting layer 13, and protective layer 14 in this order.

Light-absorbing layer 12 formed on substrate 11 contains cyanine dye (D-1) having an absorption band in the wavelength region of recording or reproducing light, cyanine dye (D-2) having an absorption band in a shorter wavelength region than that of cyanine dye (D-1) and showing a smaller absorption than that of cyanine dye (D-1) in the wavelength region of recording light or reproducing light, quencher (Q-1) preventing photo-deterioration of the cyanine dyes, and quencher (Q-2).

Light for recording or reproduction according to the present invention has a wavelength in the region of from 770 to 830 nm. Accordingly, cyanine dyes (D-1) to be used in the present invention include those represented by formula (I):

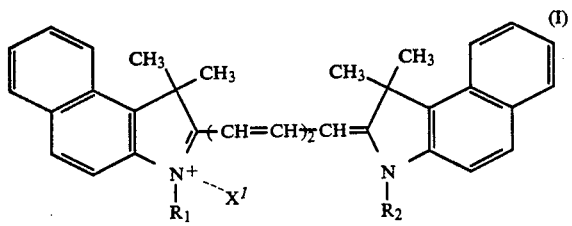

wherein $R_1$ and $R_2$ each represents an alkyl group having from 1 to 8 carbon atoms; and $X^-$ represents a counter ion.

In formula (I), the alkyl group $R_1$ or $R_2$ preferably contains from 3 to 5 carbon atoms. If the carbon atom number exceeds 8, the compound suffers from accelerated deterioration in high temperature and high humidity testing and becomes waxy and difficult to handle. The counter ions $X^-$ include $ClO_4^-$, $I^-$, and $Br^-$.

Cyanine dyes (D-2) which can be used in the present invention include those represented by formula (II):

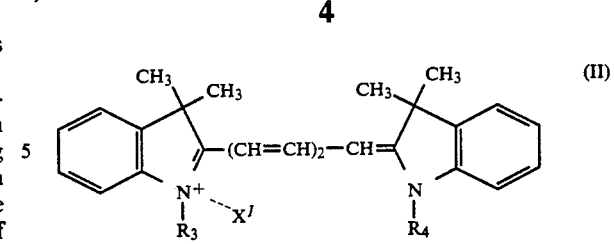

wherein $R_3$ and $R_4$ each represent an alkyl group having from 1 to 8 carbon atoms; and $X^-$ is as defined above.

In formula (II), the alkyl group $R_3$ or $R_4$ preferably contains from 3 to 5 carbon atoms. If the carbon atom number exceeds 8, the same problems as described with respect to compounds of formula (I) arise. Specific examples of the counter ion $X^-$ are the same as those enumerated above.

Quencher (Q-1) which is incorporated into light-absorbing layer 12 for the purpose of preventing photo-deterioration of cyanine dyes (D-1) and (D-2) preferably includes metal complexes. Examples of suitable metal complexes include nickel complexes represented by formula (III):

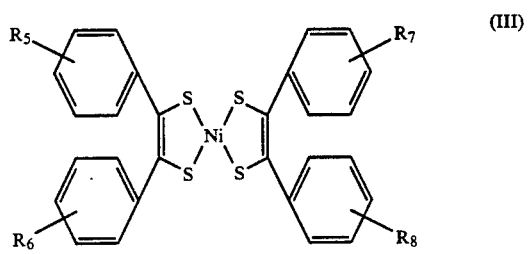

wherein $R_5$, $R_6$, and $R_8$ each represents a hydrogen atom or a substituent therefor, e.g., $CH_3O-$, $CH_3OCH_2CH_2O-$, $CH_3COO-$, $(n-C_3H_7)_2N-$, $(C_2H_5)_2N-$, and $Cl-$.

Specific examples of the compounds of formula (III) are shown below.

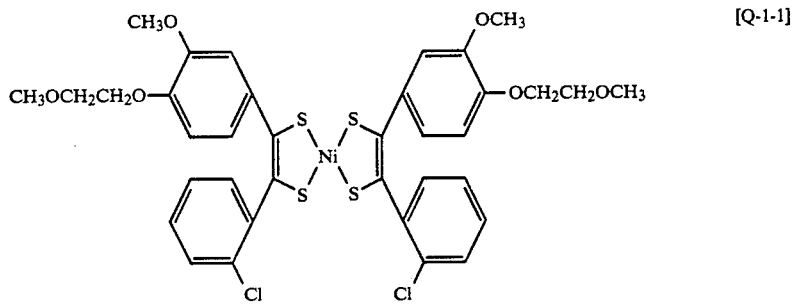

[Q-1-1]

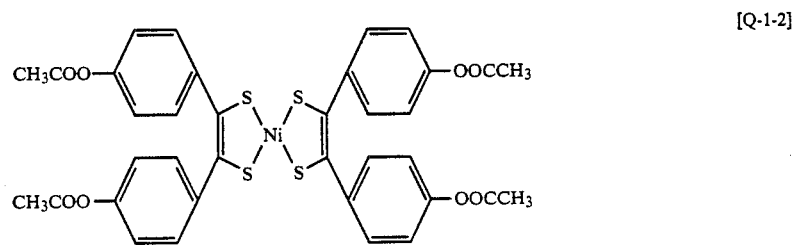

[Q-1-2]

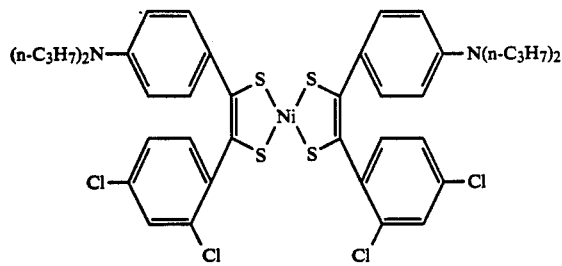

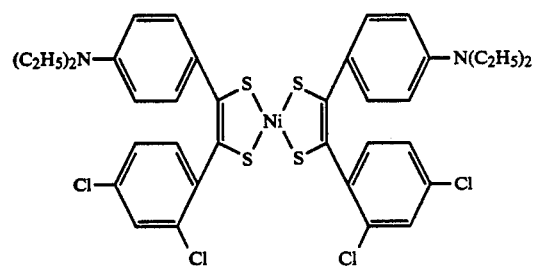

Of these compounds, [Q-1-1] is particularly preferred for its preventive effect on photo-deterioration of the cyanine dyes.

Quencher (Q-2) which is also incorporated into light-absorbing layer 12 is selected from an azo compound having formula: R—N=N—R', wherein R and R' each represents a substituted or unsubstituted alkyl group or a substituted or unsubstituted aryl group, and a diphenylamine compound. Quencher (Q-2) functions to prevent photo-deterioration of compounds resulting from decomposition of the above-described cyanine dyes upon recording, i.e., pit formation.

Quencher (Q-2) is preferably selected from an azo compound represented by formula (IV):

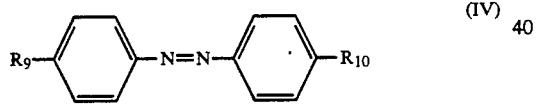

(IV)

wherein $R_9$ and $R_{10}$ each represents a nitrogen-containing substituent, and a diphenylamine compound represented by formula (V):

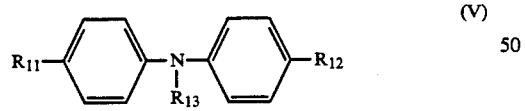

(V)

wherein $R_{11}$, $R_{12}$, and $R_{13}$ each represents a hydrogen atom, a nitro group, a nitroso group, a substituted or unsubstituted amino group, or a substituted or unsubstituted aryl group.

Particularly preferred of these compounds are azo compounds and diphenylamine compounds having an absorption peak in the wavelength region of from 400 to 500 nm in which the cyanine reaction residues have absorption bands. A quencher whose absorption peak exceeds the upper limit of the above-recited range would show an absorption in the recording wavelength, causing changes of overall characteristics of recording and reproduction. Compounds whose absorption peak is less than 400 nm are mere ultraviolet absorbents which show the same absorption as the dyes in the short wavelength region, and addition of such compounds makes no sense. Specific examples of the compounds having an absorption peak in the wavelength region of from 400 to 500 nm are shown below.

[Q-1-3]

[Q-1-4]

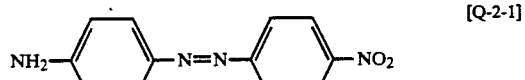

[Q-2-1]

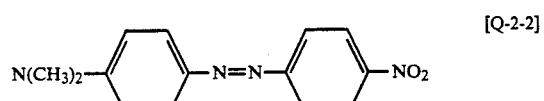

[Q-2-2]

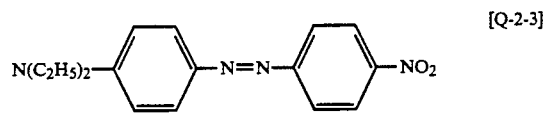

[Q-2-3]

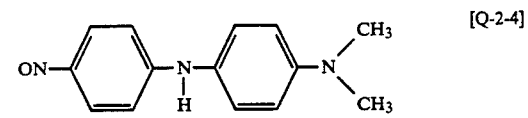

[Q-2-4]

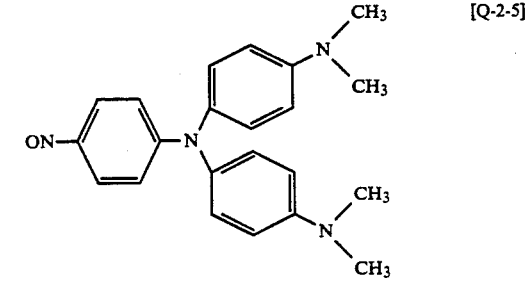

[Q-2-5]

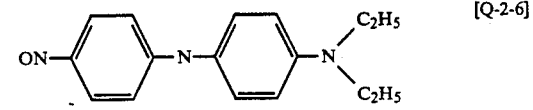

[Q-2-6]

Cyanine dyes (D-1) and (D-2) and quenchers (Q-1) and (Q-2) should be used in such amounts that satisfy the following formulae, in which the weight ratio of cyanine dye (D-2) to cyanine dye (D-1) is taken as $\alpha$, the weight ratio of quencher (Q-1) to quencher (Q-2) is taken as $\beta$, and the ratio of the total weight of quenchers (Q-1) and (Q-2) to the total weight of cyanine dyes (D-1) and (D-2) is taken as $\gamma$:

$\alpha = 1$ to $3$
$\beta = 0.5$ to $1$
$\gamma = 0.25$ to $0.5$
$\alpha \bullet \gamma < 1.1$ Should these conditions not be fulfilled, the reflectance of reproducing light decreases, the recording sensitivity decreases, and a power required for recording increases. Besides, photo-deterioration caused by reproducing light and also light of other wavelength regions is accelerated.

Light-absorbing layer 12 containing cyanine dyes (D-1) and (D-2) and quenchers (Q-1) and (Q-2) can be formed by commonly employed means, such as spin coating. If a coating composition has too low concentrations of cyanine dyes (D-1) and (D-2), absorption sensitivity is reduced, resulting in a failure of signal recording with a semi-conductor laser. Too high concentrations only result in a difficulty in dissolving these dyes in a solvent.

Light-absorbing layer 12 has a thickness usually of from 30 to 900 nm, and preferably of from 100 to 300 nm. If the thickness is less than 30 nm, sensitivity in the wavelength region of a semi-conductor laser is reduced due to reduced absorption, sometimes resulting in a failure of recording. If it exceeds 900 nm, the dyes are too thick, and the so increased absorption causes a reduction in reflectance.

Conventional solvents can be used for coating. Examples of suitable solvents are diacetone alcohol, ethyl cellosolve, methyl cellosolve, isophorone, methanol, and tetrafluoropropanol.

On one side of light-transmitting substrate 11 on which light-absorbing layer is to be formed, pregrooves 70 for tracking are formed concentrically or spirally as shown in Table 3.

Pregrooves 70 preferably have a depth (h) of from $\lambda/6.5$ n to $\lambda/2.5$ n, and more preferably from $\lambda/4.7$ n to $\lambda/3.6$ n, wherein $\lambda$ is a wavelength (nm) of light for recording or reproduction, and n is a refractive index. If the pregroove depth is less than $\lambda/6.5$ n, cross-talk tends to become appreciable, resulting in a reduction of potential of so-called 3 beam tracking error (TE$_{3b}$) required for stable reproduction on a CD player. If it exceeds $\lambda/2.5$ n, the amount of the dyes filled in the pregrooves increases to increase absorption, showing a tendency that the reflectance becomes insufficient.

Recording or reproducing light generally employed has a wavelength $\lambda$ of from 770 to 830 nm.

Figure 3:
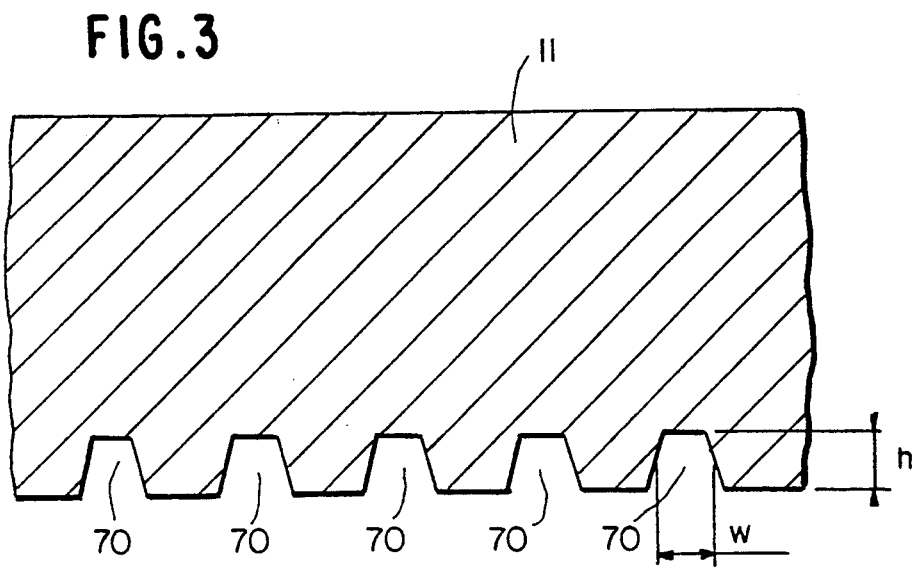
FIG. 3 is a cross section of a substrate with its pregrooves being enlarged.

The pregrooves preferably have a width (w) of from 0.35 to 0.47 $\mu$m, and more preferably from 0.37 to 0.45 $\mu$m. A pregroove width of less than 0.35 $\mu$m tends to cause reductions in potential of push-pull tracking error (TE$_{pp}$), recording sensitivity, and recording amplitude. A pregroove width exceeding 0.47 $\mu$m tends to result in a reduction in TE$_{pp}$ and an increase in cross-talk. Since pregrooves 70 usually have a trapezoidal section as shown in FIG. 3, the terminology "pregroove width (w)" as used herein is defined to be a half-depth width, i.e., a width at the position half the depth (h).

From the standpoint of productivity, pregrooved substrate 11 is preferably prepared by integral injection molding of transparent molding materials, such as polycarbonate resins and polymethyl methacrylate resins. In particular, polycarbonate resins having an average molecular weight of 32000 to 40000 are preferably used. In addition to integrally molded substrates, substrates prepared by so-called 2P (photo-polymer) method may also be employed. Substrate 11 usually has a thickness of from about 1.0 to 1.5 mm.

On light-absorbing layer formed on substrate 11, light-reflecting layer 13 comprising a metal, e.g., Au, Ag, Cu, and Al, is provided by vacuum evaporation, sputtering, ion plating or the like technique. Light-reflecting layer 13 usually has a thickness of from about 0.02 to 2.0 $\mu$m.

For the purpose of protecting light-absorbing layer 12 and light-reflecting layer 13, protective layer 14 is usually formed on light-reflecting layer 13. Protective layer 14 is generally formed by coating a ultraviolet-curing resin by spin coating, followed by curing by ultraviolet irradiation. In addition, epoxy resins, acrylic resins, silicone resins, urethane resins, etc. may be used as materials of protective layer 14. Protective layer 14 usually has a thickness of from about 0.1 to 100 $\mu$m.

If desired, an intermediate layer may be provided between substrate 11 and light-absorbing layer 12 for protecting substrate 11 from a solvent and/or between light-absorbing layer 12 and light-reflecting layer 13 for improving absorption efficiency.

The present invention is now illustrated in greater detail with reference to Examples, but it should be understood that the present invention is not deemed to be limited thereto.

EXAMPLE 1

In Example 1, a compound of formula (I) wherein R$_1$ and R$_2$ each represent n-C$_4$H$_9$, and X$^{-1}$ is ClO$_4^-$ and a compound of formula (II) wherein R$_3$ and R$_4$ each represent n-C$_3$H$_7$, and X$^-$ is I$^-$ were used as cyanine dyes (D-1) and (D-2), respectively, and [Q-1-1] and [Q-2-1] or [Q-2-4] as quenchers (Q-1) and (Q-2), respectively.

The cyanine dyes and quenchers were dissolved in ethyl cellosolve at weight ratios shown in Table 1 below, and the resulting coating composition was coated on a polycarbonate substrate of 120 mm in diameter and 1.2 mm in thickness having previously formed thereon spiral grooves by injection molding to form a light-absorbing layer having a thickness of 250 nm. A light-reflecting layer comprising Au was formed on the light-absorbing layer by vacuum evaporation to a thickness of 0.1 $\mu$m. A protective layer comprising a photopolymer was further provided on the light-reflecting layer. The resulting recording media were designated Samples 101 to 116.

Each sample was tested to measure a power of recording light for achieving actual recording. The results obtained are shown in Table 1. In Table 1, the weight ratios of the compounds used are expressed as converted to $\alpha$, $\beta$, $\gamma$, and $\alpha \bullet \gamma$ values.

TABLE 1

| Sample No. | (Q-2) | $\alpha$ | $\beta$ | $\gamma$ | $\alpha \cdot \gamma$ | Recording Power (mW) |
|---|---|---|---|---|---|---|
| 101 | Q-2-1 | 3 | 0.903 | 0.261 | 0.782 | 7.6 |
| 102 | Q-2-1 | 2.6 | 0.903 | 0.261 | 0.677 | 7.5 |
| 103 | Q-2-1 | 2 | 0.903 | 0.261 | 0.521 | 7.3 |
| 104 | Q-2-1 | 1.57 | 0.903 | 0.261 | 0.409 | 7.0 |
| 105 (comparative) | Q-2-1 | 3 | 0.445 | 0.459 | 1.378 | 8.5 |

TABLE 1-continued

| Sample No. | (Q-2) | $\alpha$ | $\beta$ | $\gamma$ | $\alpha \cdot \gamma$ | Recording Power (mW) |
|---|---|---|---|---|---|---|
| 106 (comparative) | Q-2-1 | 2.4 | 0.445 | 0.472 | 1.133 | 8.3 |
| 107 | Q-2-1 | 2.09 | 0.445 | 0.468 | 0.977 | 8.0 |
| 108 | Q-2-1 | 1.58 | 0.445 | 0.468 | 0.739 | 7.8 |
| 109 | Q-2-1 | 1.21 | 0.445 | 0.468 | 0.566 | 7.6 |
| 110 | Q-2-1 | 1 | 0.445 | 0.468 | 0.468 | 7.4 |
| 111 | Q-2-4 | 2 | 1 | 0.278 | 0.556 | 7.5 |
| 112 | Q-2-4 | 2 | 0.667 | 0.347 | 0.694 | 7.5 |
| 113 | Q-2-4 | 2 | 0.5 | 0.417 | 0.833 | 8.0 |
| 114 (comparative) | Q-2-4 | 2 | 0.333 | 0.556 | 1.111 | 8.0 |
| 115 (comparative) | Q-2-4 | 3 | 0.445 | 0.459 | 1.378 | 8.5 |
| 116 (comparative) | Q-2-4 | 2.4 | 0.445 | 0.472 | 1.133 | 8.3 |

It can be seen from the results of Table 1 that the samples according to the present invention achieve stable recording, and their recording sensitivity can be controlled by adjusting a weight ratio of cyanine dye (D-2) to cyanine dye (D-1).

EXAMPLE 2

Performance properties on repeated reproduction were tested as follows.

Samples 201 and 205 were prepared in the same manner as for Samples 103 and 111 of Example 1, respectively.

Comparative Samples 202 and 206 were prepared in the same manner as for Samples 103 and 111 of Example 1, respectively, except for replacing [Q-1-1] with a comparative compound (Q) of formula:

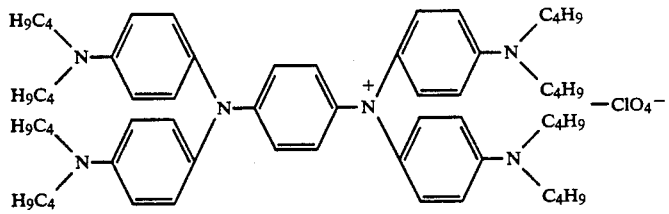

Comparative Sample 203 and 207 were prepared in the same manner as for Samples 103 and 111 of Example 1, respectively, except for using no (Q-1).

Commercially available recording media purchases of other maker were used as Comparative Samples 204 and 208.

Figure 4A:
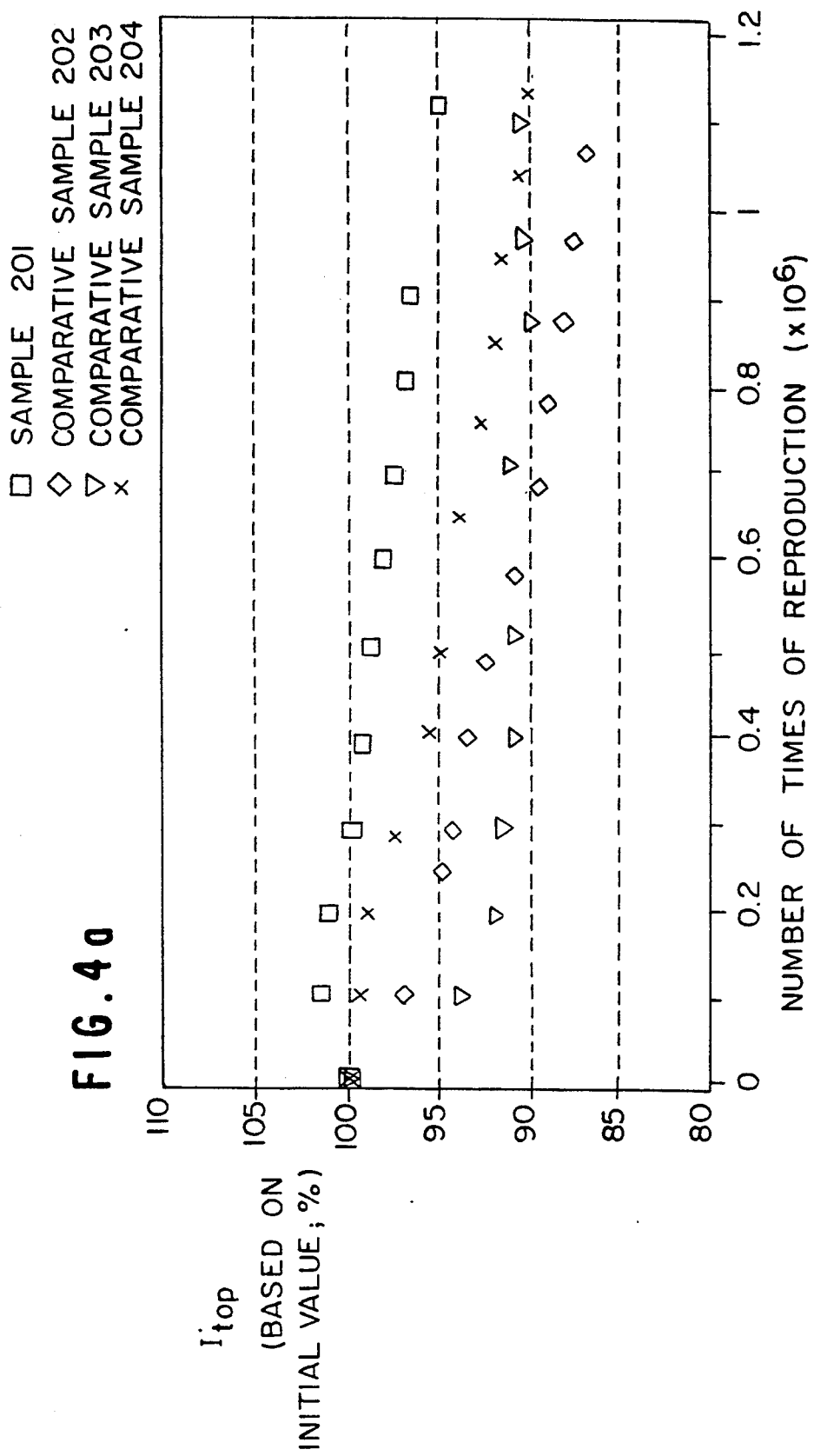
FIGS. 4a and 4b are plots of change of $I_{top}$ (% based on the initial value) vs. number of times of reproduction.
Figure 4B:
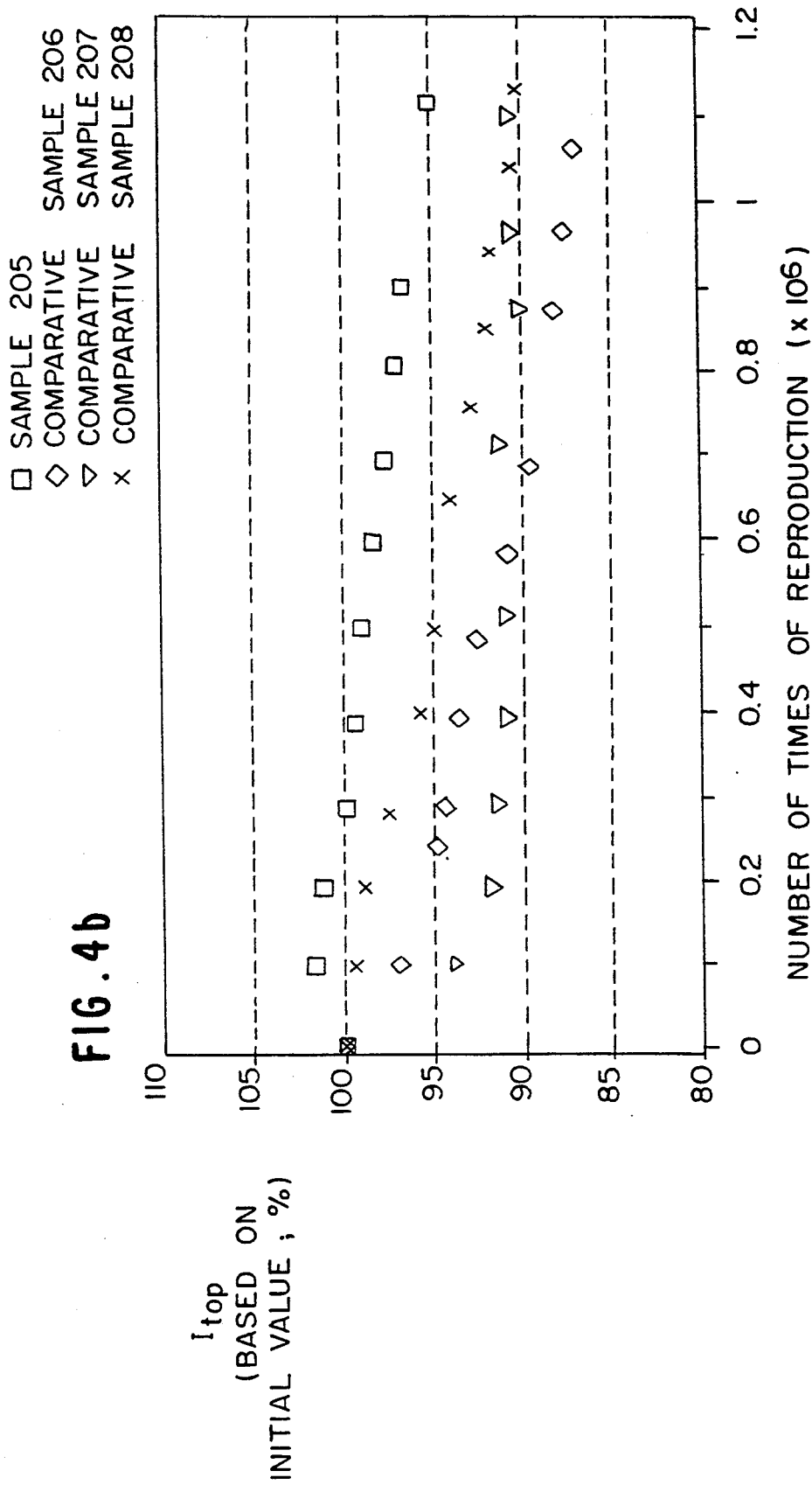
Figure 5A:
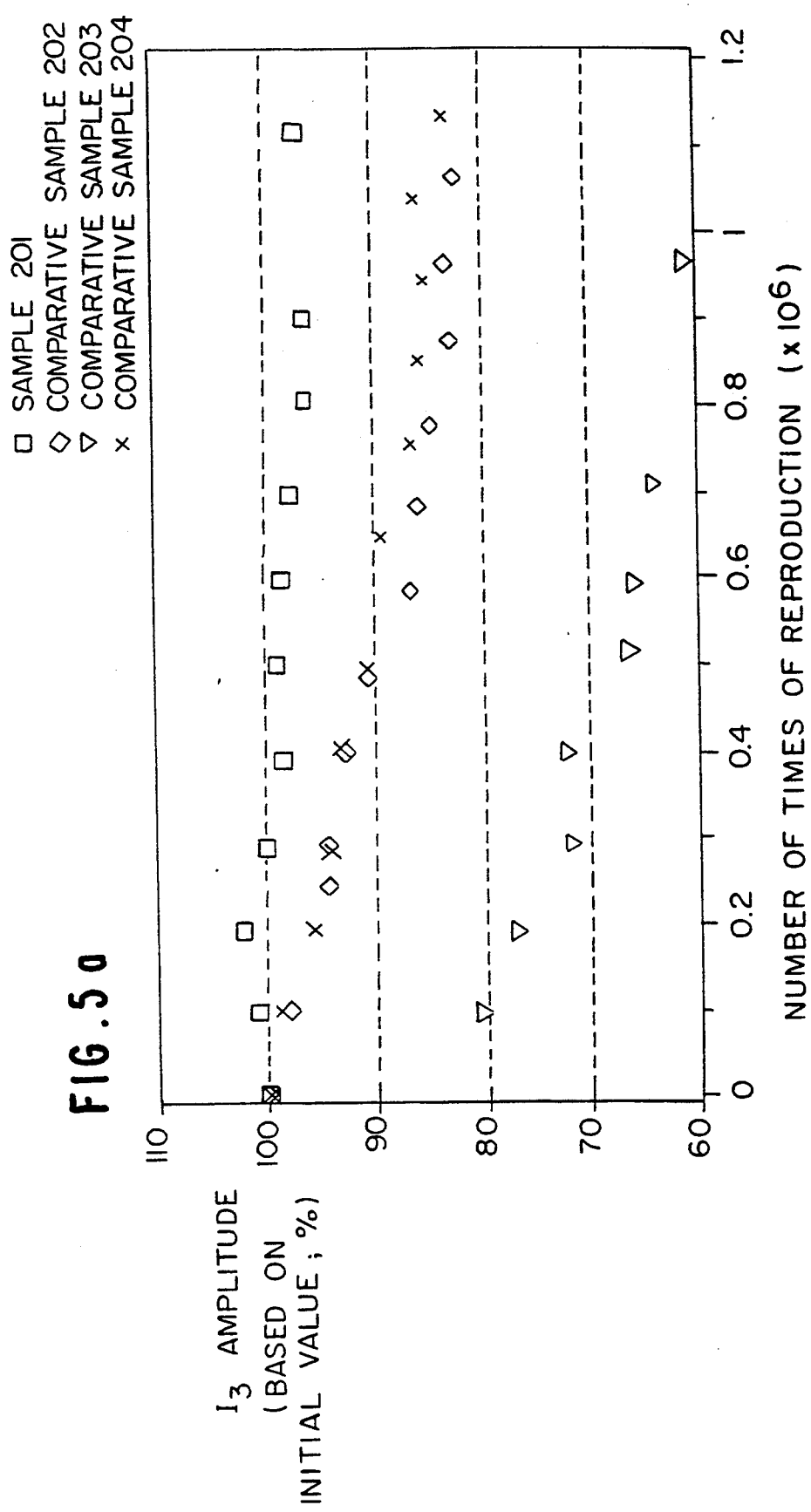
Figure 6A:
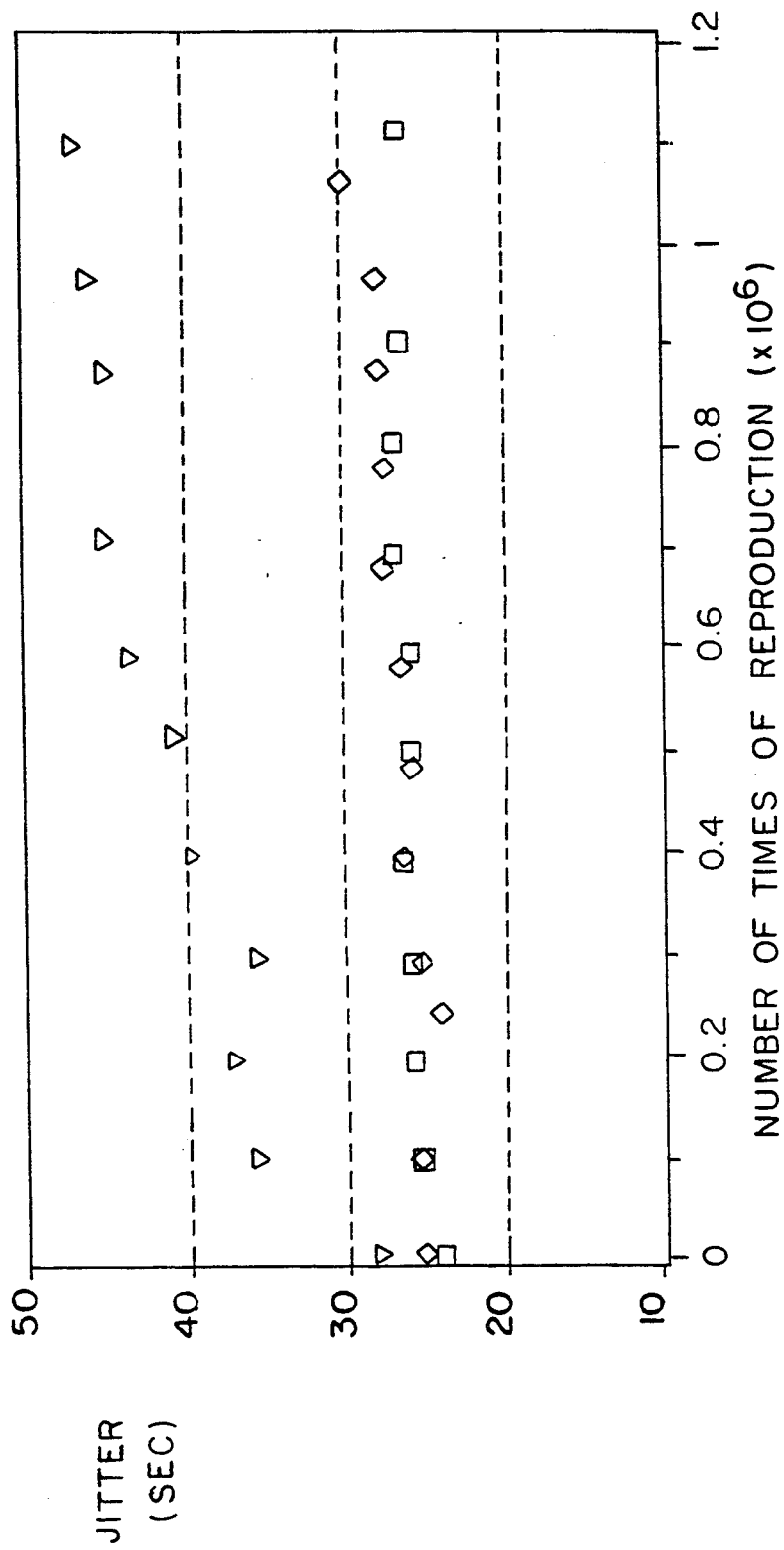
FIGS. 6a and 6b are plots of jitter vs. number of times of reproduction.
Figure 6B:
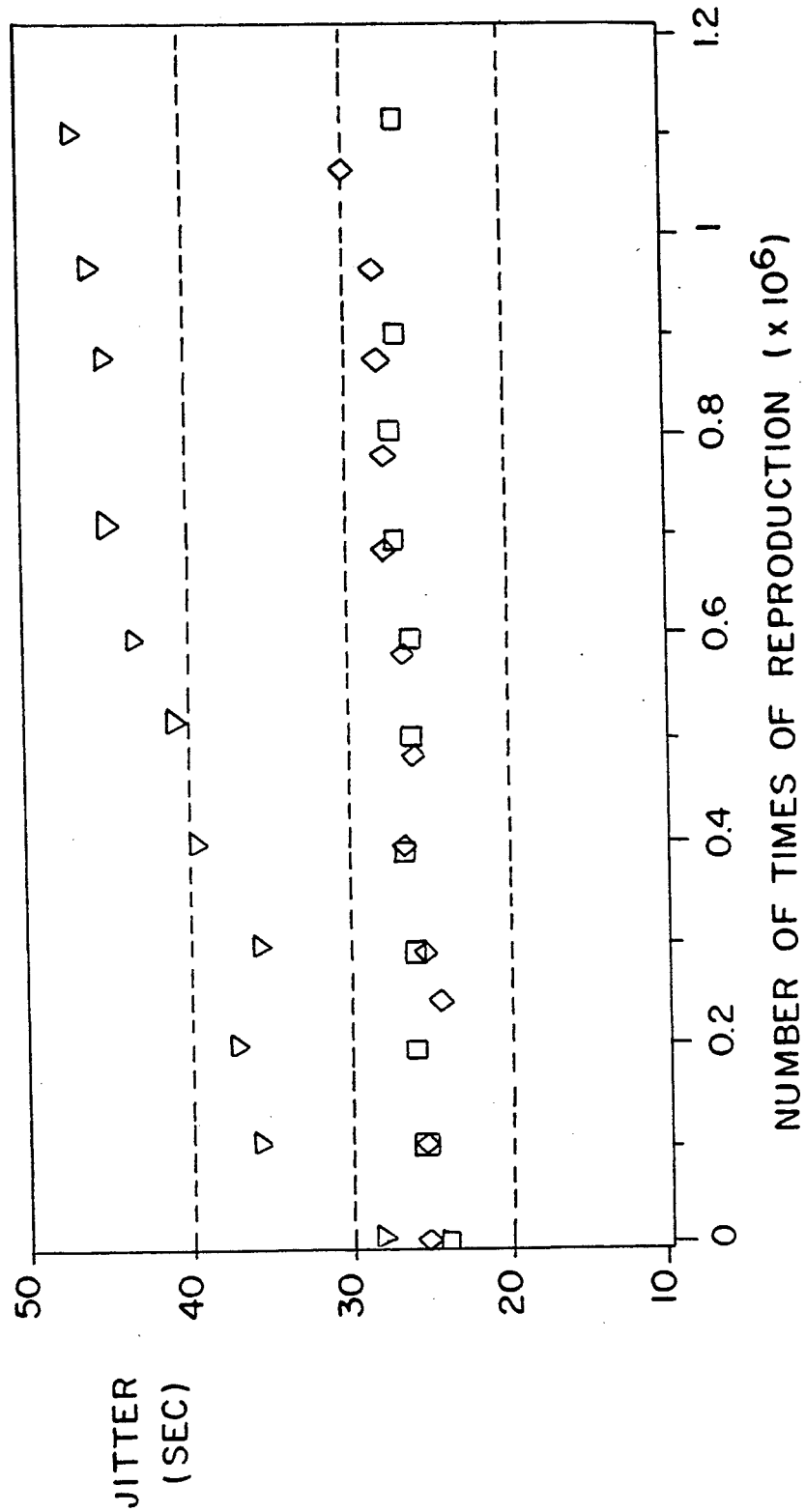

Each of Samples 201 to 208 was evaluated by measuring $I_{top}$ value, $I_3$ value, and jitter on repetition of reproduction. The results of the samples containing [Q-2-1] (Samples 201 to 203) and Comparative Sample 204 are shown in FIGS. 4a, 5a, and 6a, while those of the samples containing [Q-2-4] (Samples 205 to 207) and Comparative Sample 208 are shown in FIGS. 4b, 5b, and 6b. These results prove superiority of the samples according to the present invention in performance properties on repeated reproduction.

EXAMPLE 3

Samples 301 and 303 were prepared in the same manner as for Samples 103 and 111, respectively.

Comparative Samples 302 and 304 were prepared in the same manner as for Samples 103 and 111, respectively, except that (Q-2) was not used, $\alpha$ ((D-2)/(D-1) weight ratio) was 3, and a weight ratio of (Q-1) to (D-1)+(D-2) was 1/6.

Light resistance of these samples was tested according to the following method.

Light Exposure Test

An FL tube having a spectrum very close to sunlight and an UV tube emitting ultraviolet light were set close to each other, and a sample was placed 15 cm right under the tubes and exposed to light (about 20000 lux). Light resistance was evaluated in terms of BER (block error rate).

Figure 7A:
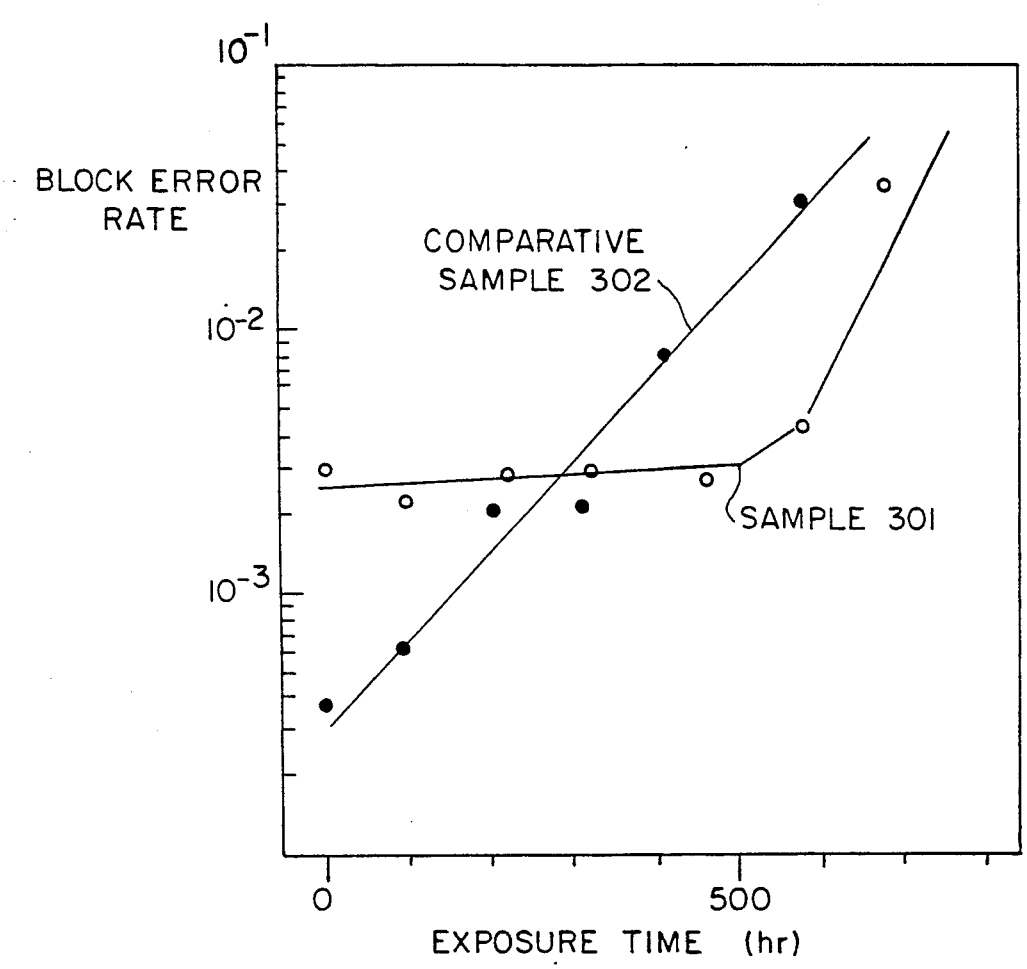
FIGS. 7a and 7b are plots of BER vs. light exposure time.
Figure 7B:
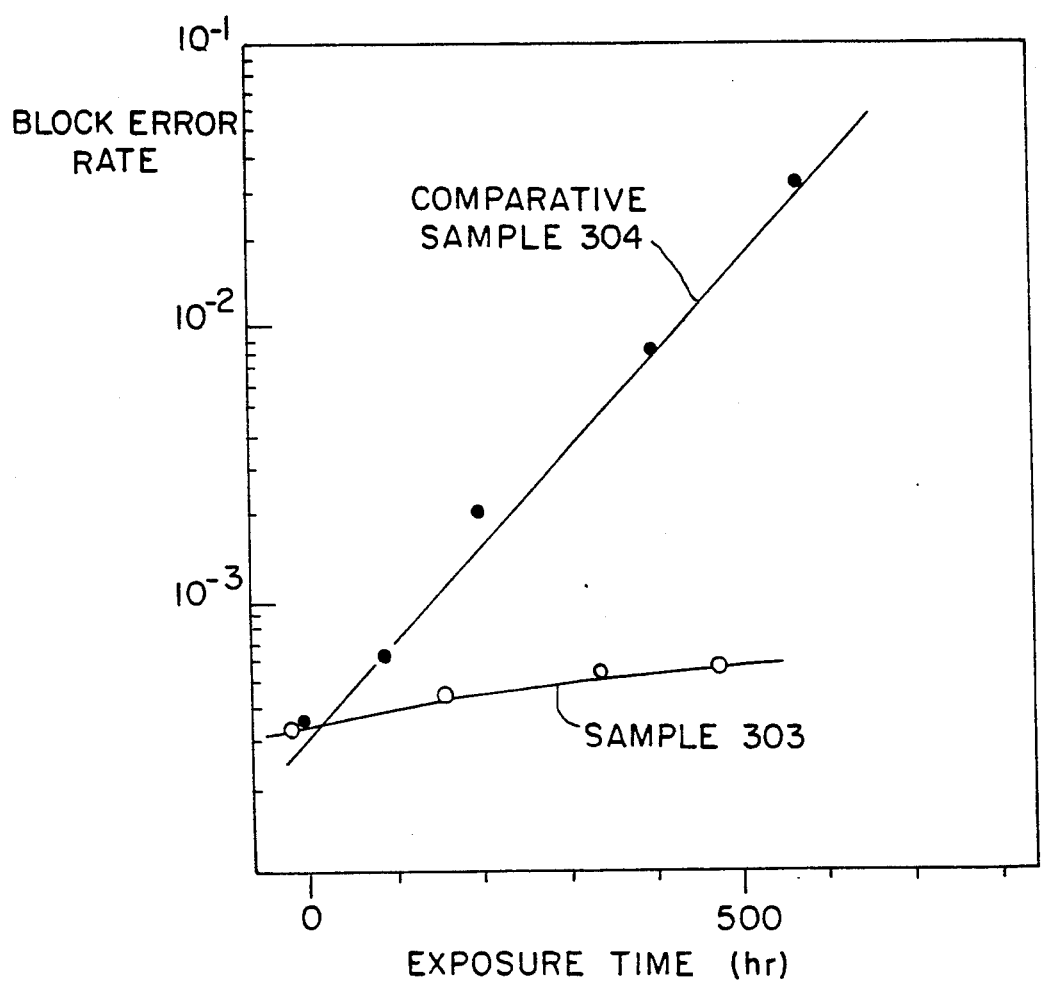

The results of the sample using [Q-2-1] (Sample 301) and Sample 302 are shown in FIGS. 7a, and those of the sample using [Q-2-4] (Sample 303) and Sample 304 are shown in FIG. 7b. FIGS. 7a and 7b are plots of BER vs. exposure time, in which white circles indicate samples of the present invention, and black circles the comparative samples. In FIG. 7b, the results of Sample 303 are averages of a plurality of samples. It can be seen that the samples of the present invention undergo no increase of error rate, proving extremely excellent in light resistance.

Figure 8:
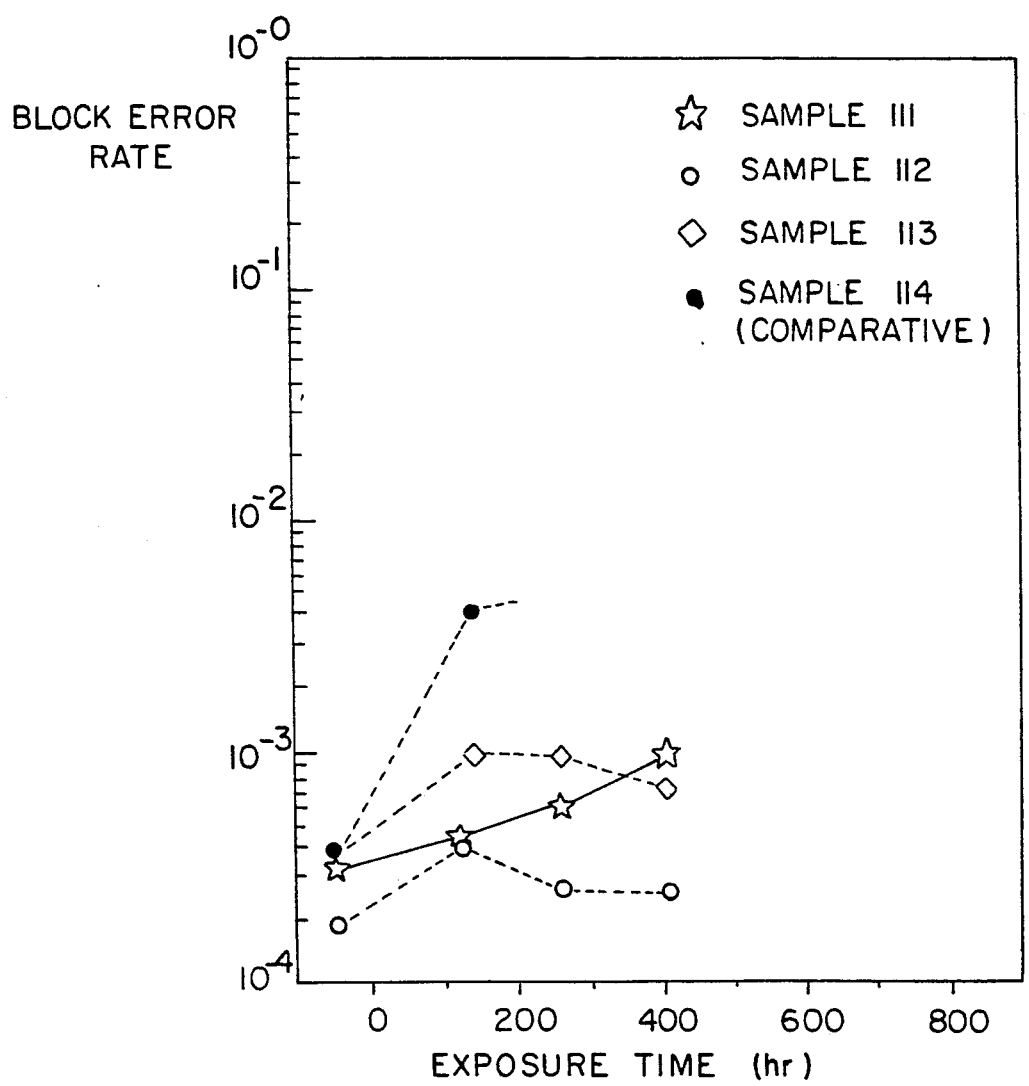
FIGS. 8 is a plot of BER vs. light exposure time.

Samples 111 to 114 prepared in Example 1 were also tested in the same manner as described above. The results obtained are shown in FIG. 8. FIG. 8 reveals that the samples according to the present invention are excellent in light resistance whereas the comparative sample in which the compounding ratio of quenchers to cyanine dyes is out of the range specified in the present invention is poor in light resistance.

Figure 9:
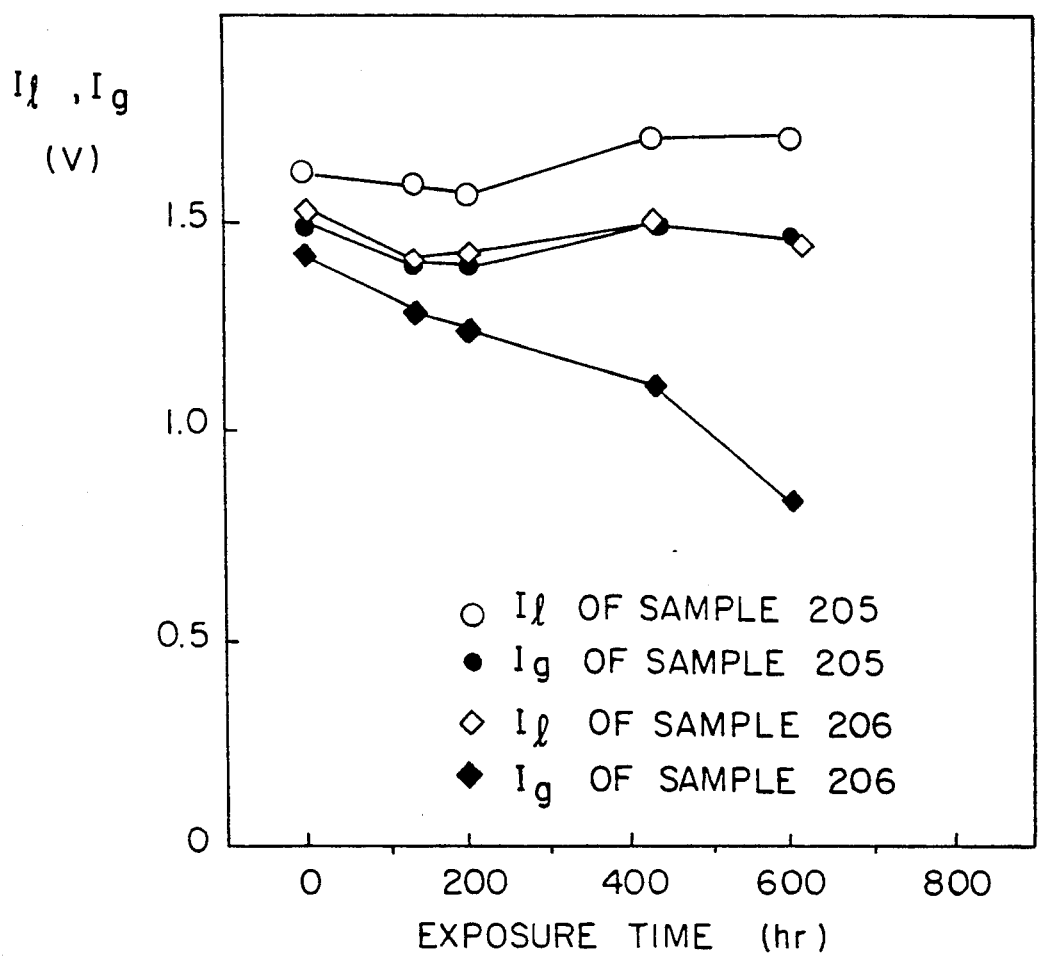
FIGS. 9 is a plot of $I_1$ and $I_g$ vs. light exposure time.

Further, each of Samples 205 (the same as Sample 111 of Example 1) and Comparative Sample 206 (the same as Sample 111, except for using comparative compound [Q] in place of [Q-1-1]) prepared in Example 2 was exposed to light under the same conditions as described above, and changes of land potential ($I_1$) and groove potential ($I_g$) with exposure time were examined. The results obtained are shown in FIG. 9. It is seen that the sample of the present invention maintains high levels of both $I_1$ and $I_g$ with little change with exposure time, proving excellent in light resistance.

EXAMPLE 4

Influences of pregroove width (w) on recording performance were examined as follows.

A polycarbonate substrate of 120 mm in diameter and 1.2 mm in thickness having pregrooves having a depth of 0.12 μm, whose width increased with the number of band as shown in Table 2 below was prepared.

TABLE 2

| Band No. | Pregroove Width (μm) |
| --- | --- |
| 3 | 0.18 |
| 4 | 0.27 |
| 5 | 0.28 |
| 6 | 0.31 |
| 7 | 0.34 |
| 8 | 0.35 |
| 9 | 0.39 |
| 10 | 0.44 |
| 11 | 0.47 |
| 12 | 0.50 |
| 13 | 0.54 |
| 14 | 0.57 |
| 15 | 0.59 |

As stated above, "pregroove width w" is a width at the half depth of the groove. The width and depth of each groove were measured with a coordinate system scanning electron microscope "Model EMM-3000" manufactured by ELIONIX K.K.

A light-absorbing layer having the same composition as used in Sample 103 or 111 or Example 1 was formed on the substrate (light-absorbing layer thickness: 250 nm). A light-reflecting layer comprising Au was formed on the light-absorbing layer by vacuum evaporation to a thickness of 0.1 μm. A protective layer comprising a photopolymer was further provided on the light-reflecting layer. The resulting samples were designated Sample 401 (containing [Q-2-1]) and 402 (containing [Q-2-4]), respectively.

EFM signals were recorded on each sample and reproduced under the following conditions.
Wavelength: 778 nm
Linear velocity: 1.4 m/se
Writing power: 6.0 mW
Reading power: 0.5 mW Land potential $I_1$, groove potential $I_g$, potential of the highlight signals of 11T amplitude (196 KHz) ($I_{top}$), potential of signals of 11T amplitude (196 KHz) ($I_{11T}$), potential of signals of 3T amplitude (720 HKz) ($I_{3T}$), push-pull tracking error potential ($TE_{pp}$), and 3 beam tracking error potential ($TE_{3b}$) of each sample were measured.

Figure 10B:
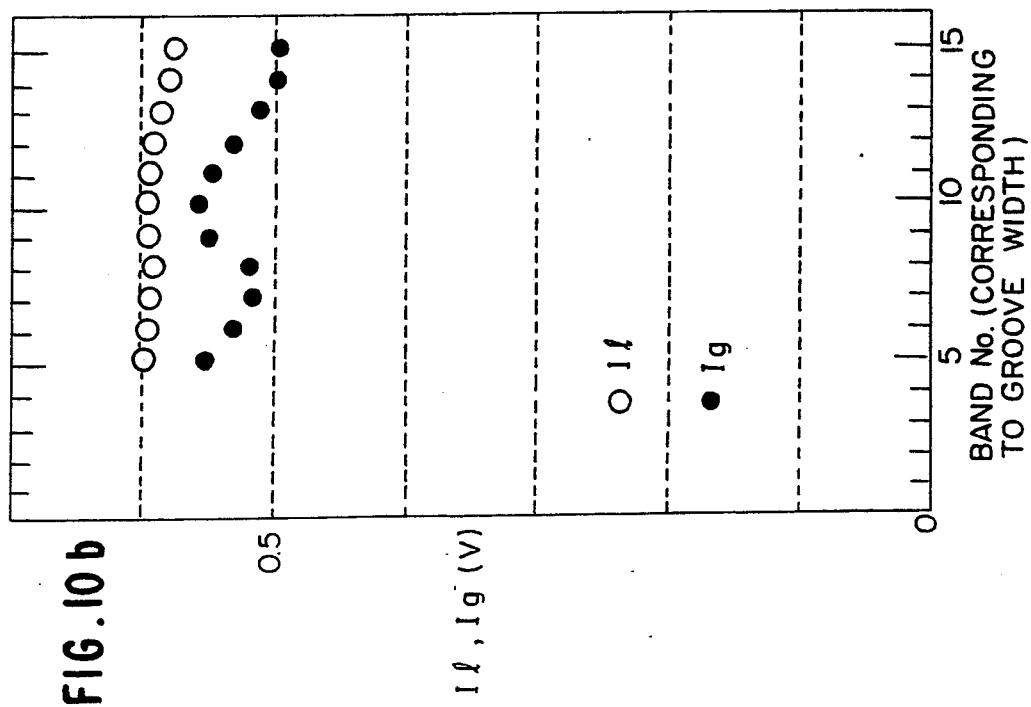
FIGS. 10a and 10b are plots of $I_1$ and $I_g$ vs. pregroove width.
Figure 10A:
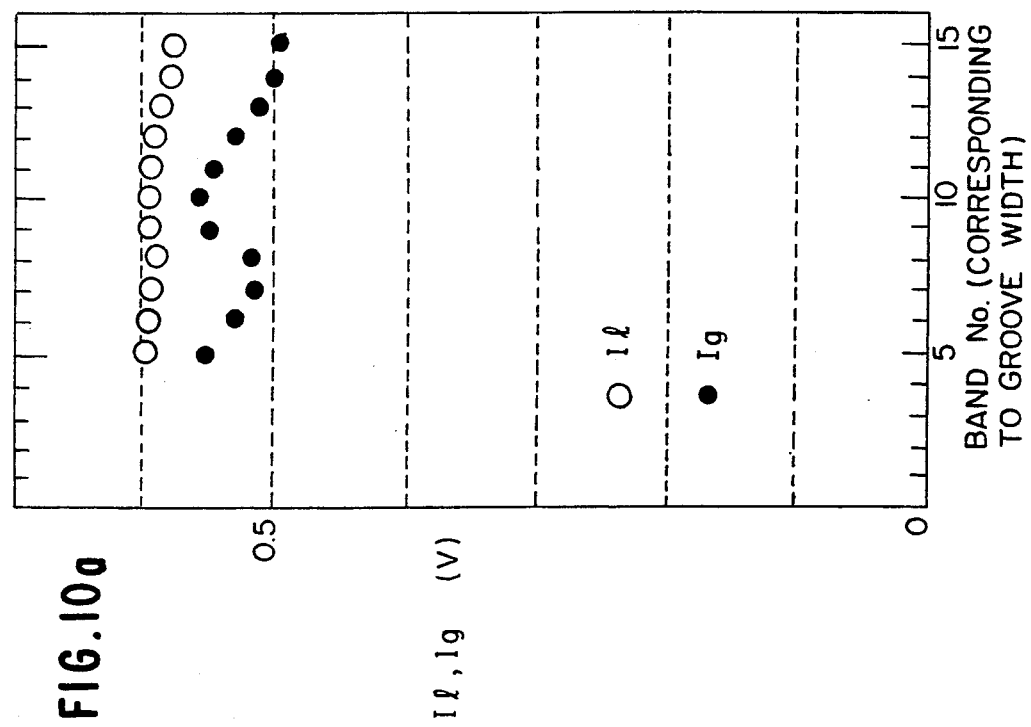
Figure 11A:
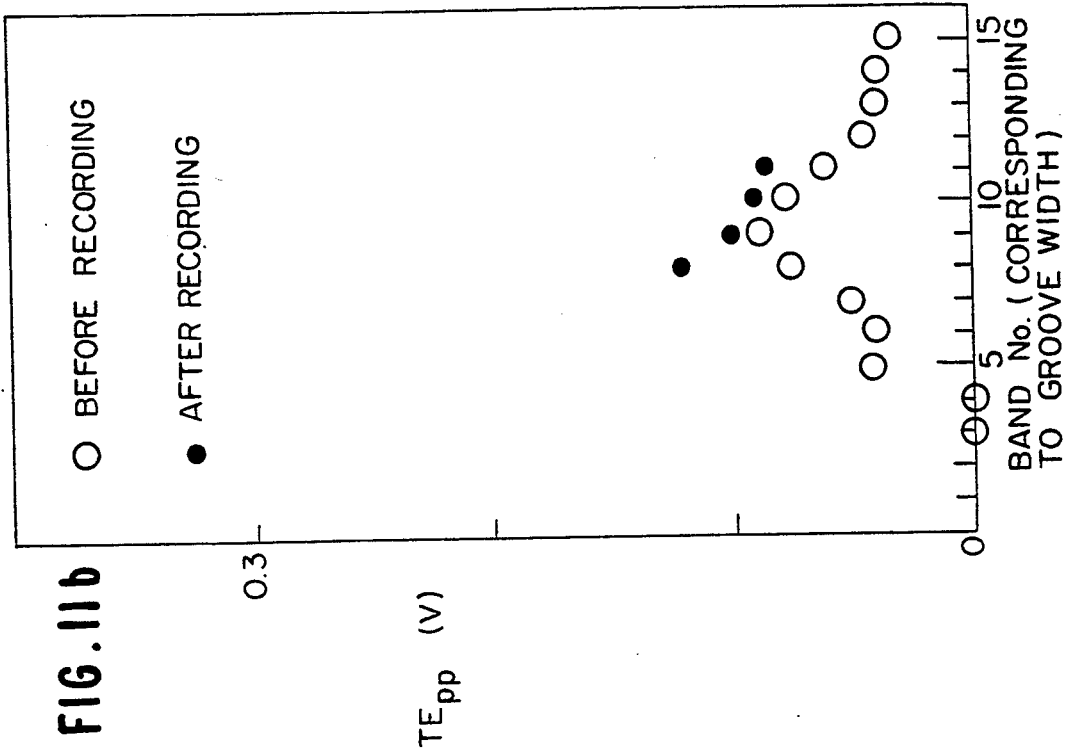
FIGS. 11a and 11b are plots of $TE_{pp}$ vs. pregroove width.
Figure 11B:
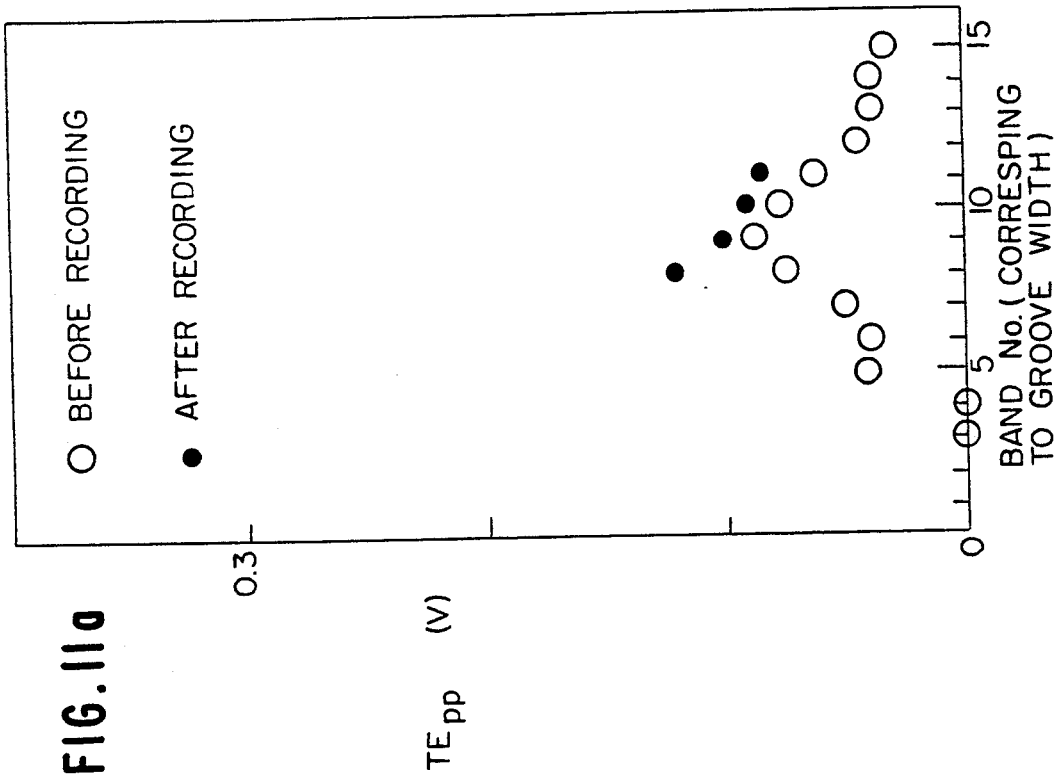
Figure 13A:
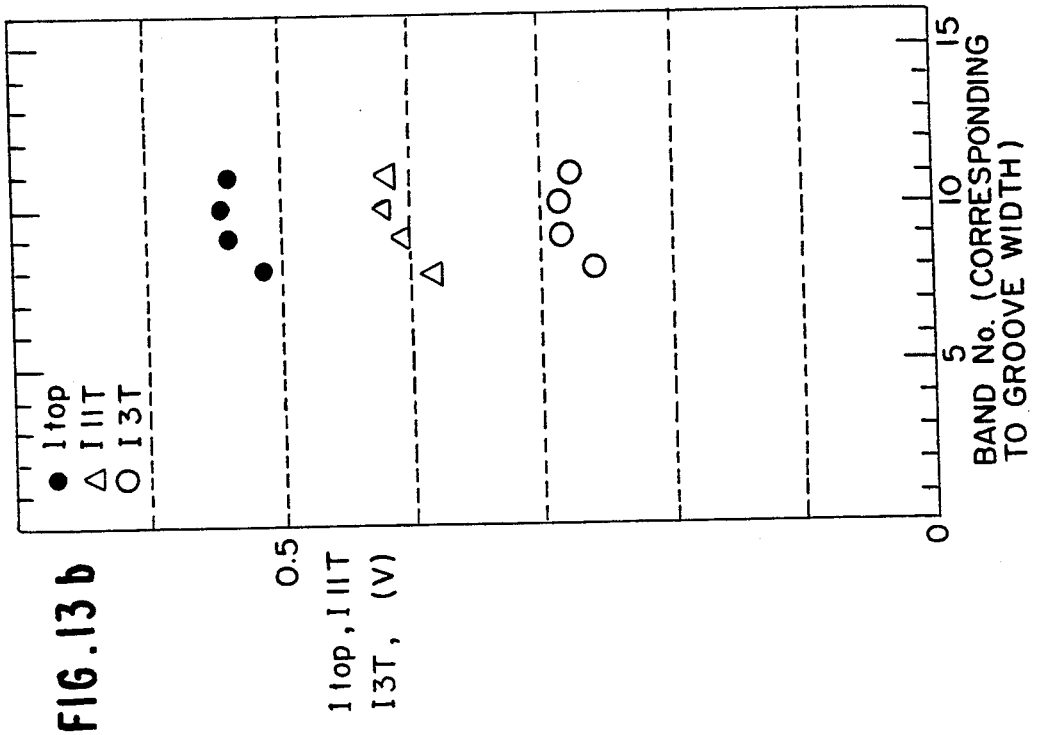
FIGS. 13a and 13b are plots of $I_{top}$, $I_{11T}$, and $I_{3T}$ vs. pregroove width.
Figure 13B:
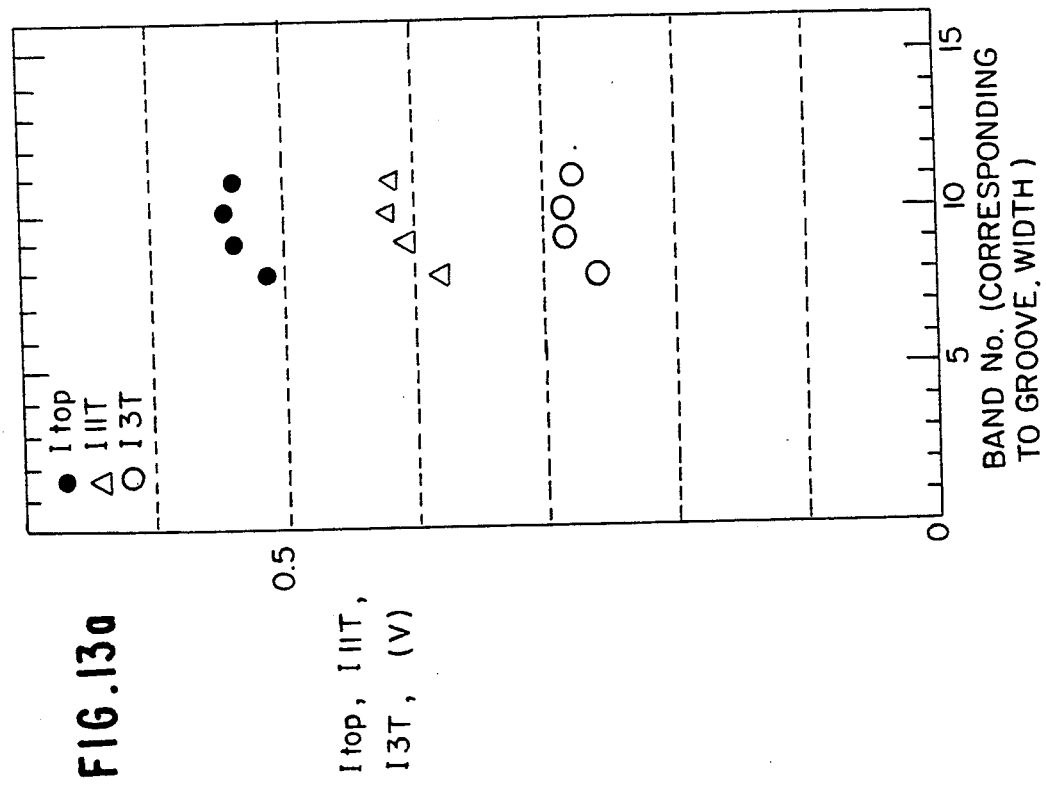

The results of Sample 401 (containing [Q-2-1]) are shown in FIGS. 10a through 13a, and those of Sample 402 (containing [Q-2-4]) in FIGS. 10b through 13b. FIGS. 10a and 10b are plots of $I_1$ and $I_g$; FIGS. 11a and 11b are plots of $TE_{pp}$ before and after recording; FIGS. 12a and 12b are plots of $TE_{3b}$; and FIGS. 13a and 13b are plots of $I_{top}$, $I_{11T}$, and $I_{3T}$.

Before evaluating these results, it must be taken into consideration that the following conditions (1) to (4) should be fulfilled for a recording medium to conform to the standards of CD.

(1) $I_1$ should be greater than $I_g$.

(2) $TE_{pp}$ must be higher than 0.04 V. This condition is necessary for stable application of tracking servo to achieve recording certainly.

(3) $TE_{3b}$ must be at least 2.5 V similar to that of commercially available CD. This condition is necessary for stable reproduction of recorded signals (pits) on a CD player.

(4) With the specification that a reflectance is not less than 65% being taken into account, $I_{top}$ must be at least 0.45 V under the above-described recording and reproduction conditions. $I_{11T}/I_{top}$ should be at least 60%, and $I_{3T}/I_{top}$ should fall within a range of from 30 to 70%.

These conditions are necessary for securing a sufficient reflectance and a high degree of modulation.

It can be seen from FIGS. 10a,b through 13a,b that band Nos. 8 to 11 (corresponding to groove width of from 0.35 to 0.47 μm) fulfill all of conditions (1) to (4).

Then, influences of pregroove depth (h) on recording performance were examined as follows.

Figure 14A:
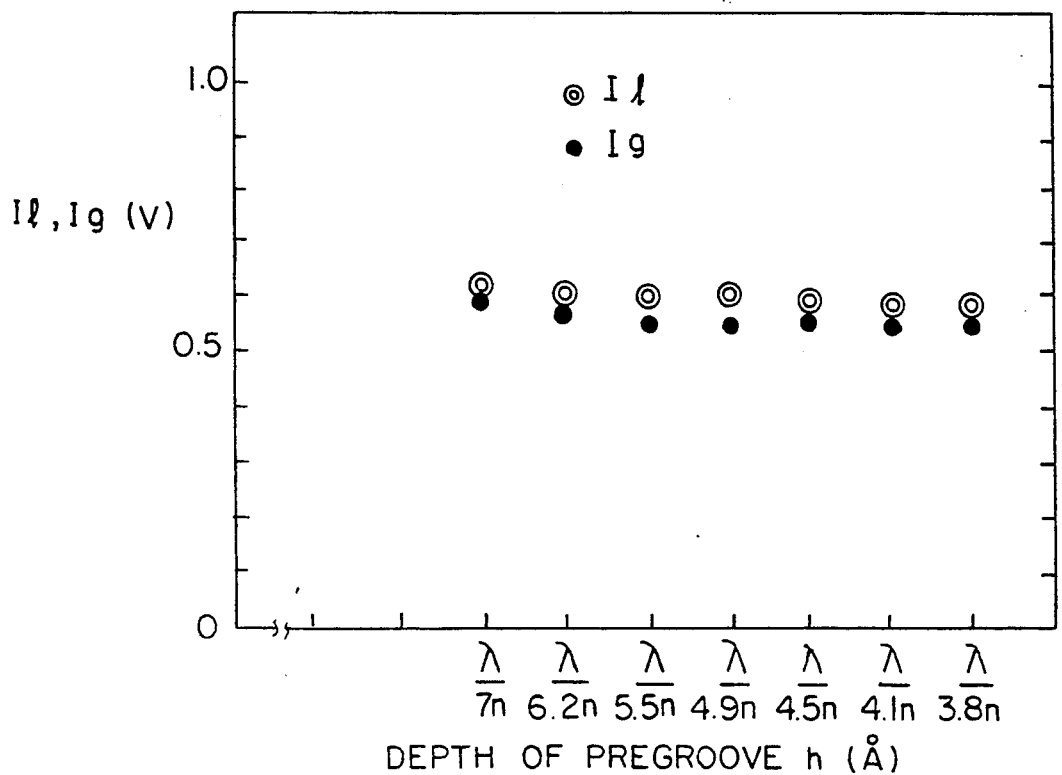
FIGS. 14a and 14b are plots of $I_1$ and $I_g$ vs. pregroove depth.
Figure 15A:
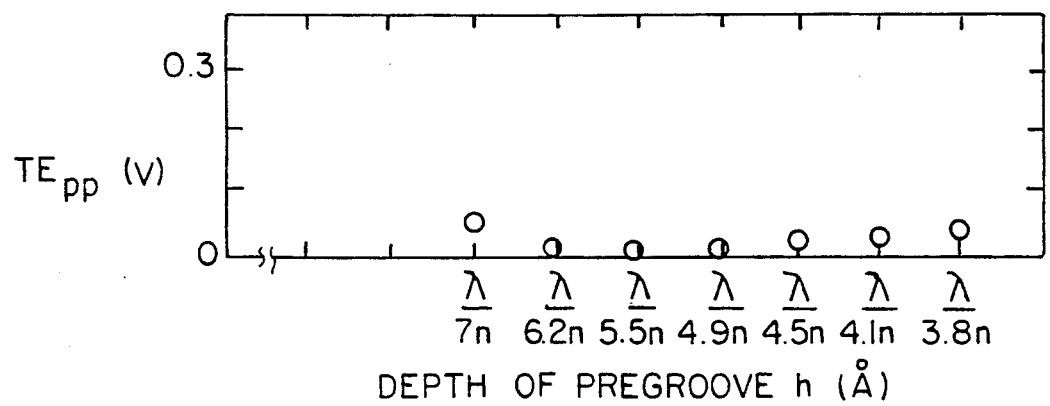
FIGS. 15a and 15b are plots of $TE_{pp}$ vs. pregroove depth.
Figure 14B:
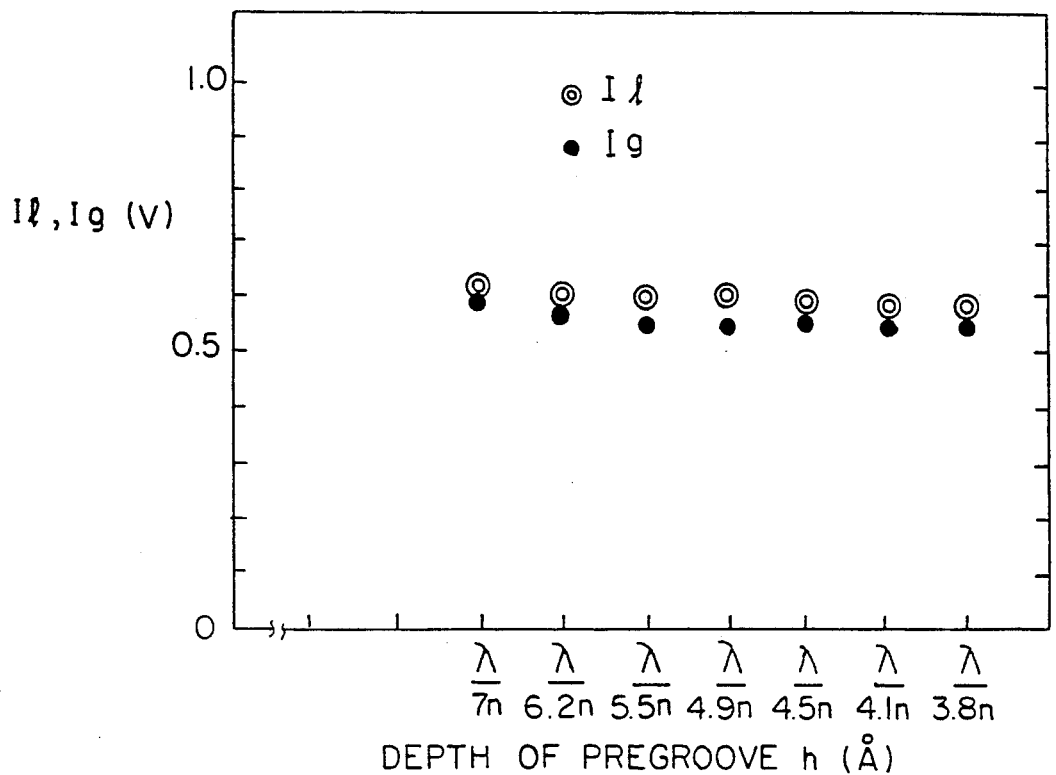
Figure 15B:
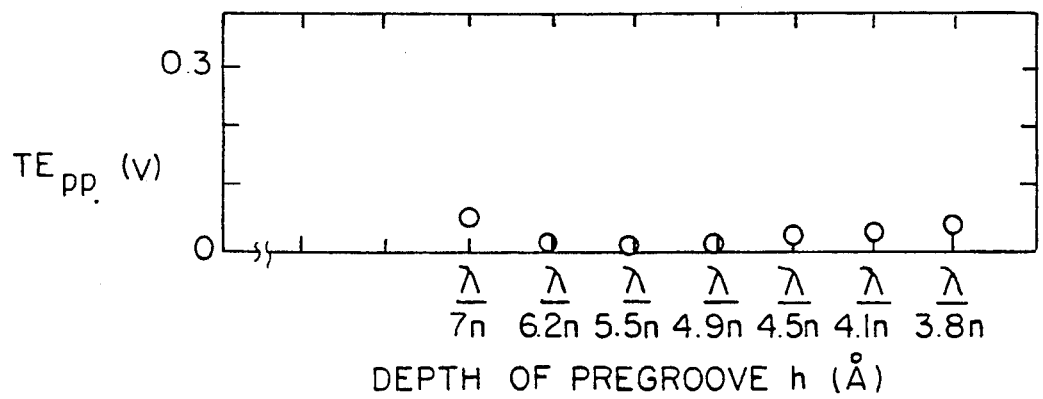
Figure 16A:
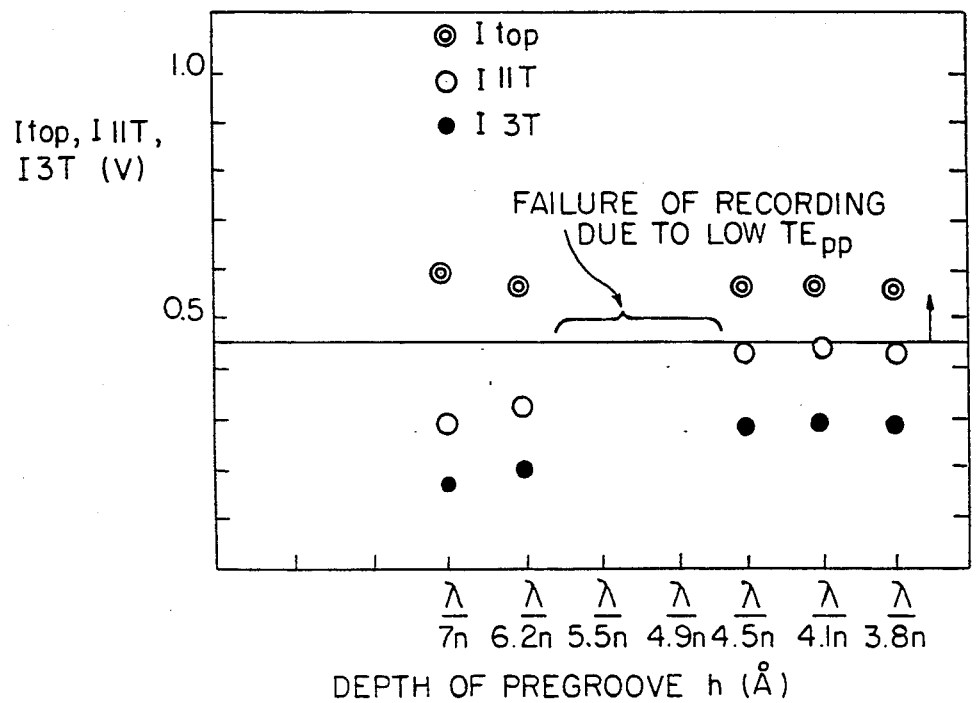
FIGS. 16a and 16b are plots of $I_{top}$, $I_{11T}$, and $I_{3T}$ vs. pregroove depth.
Figure 17A:
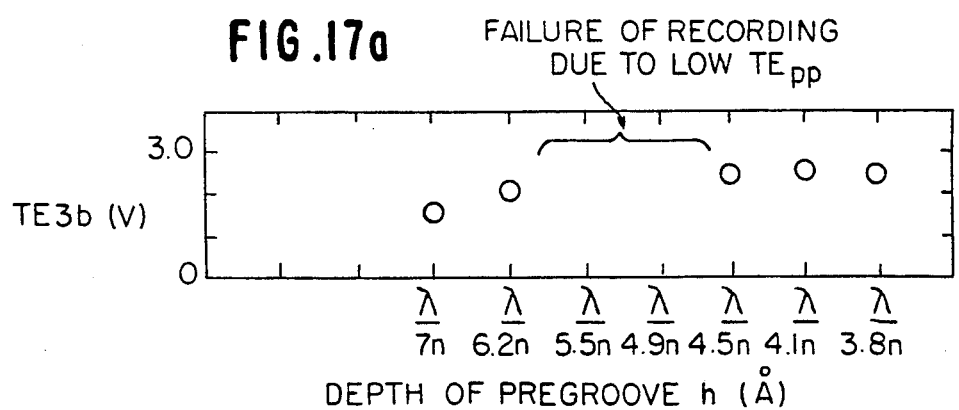
FIGS. 17a and 17b are plots of $TE_{3b}$ vs. pregroove depth.
Figure 16B:
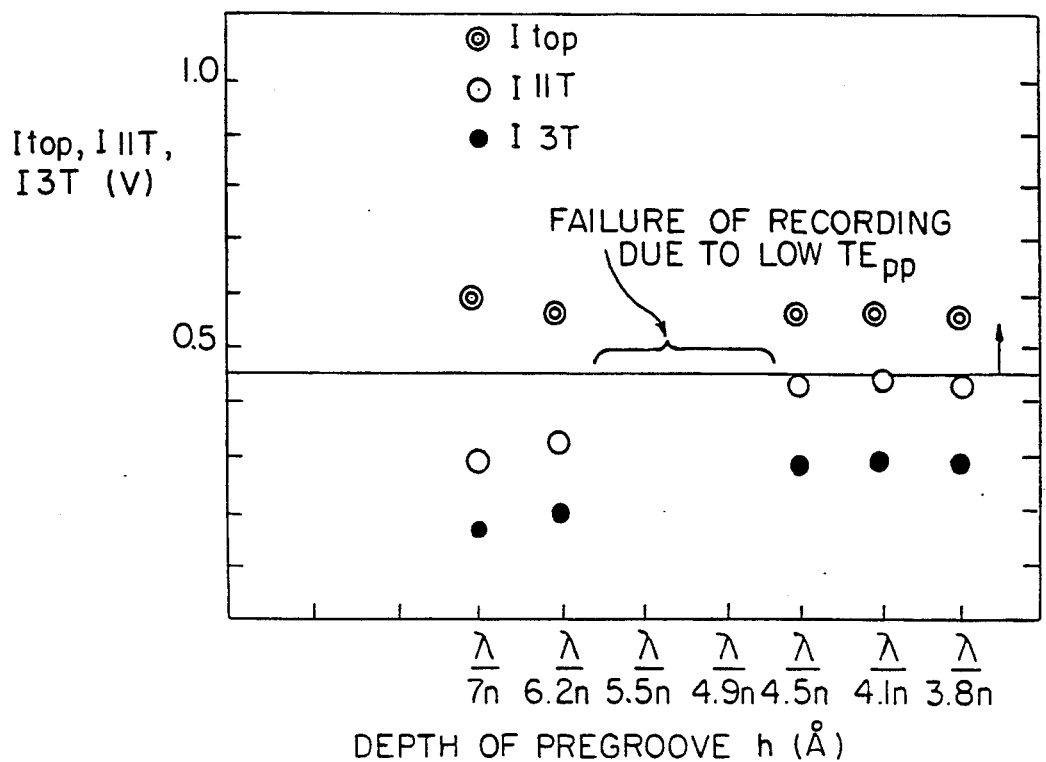
Figure 17B:
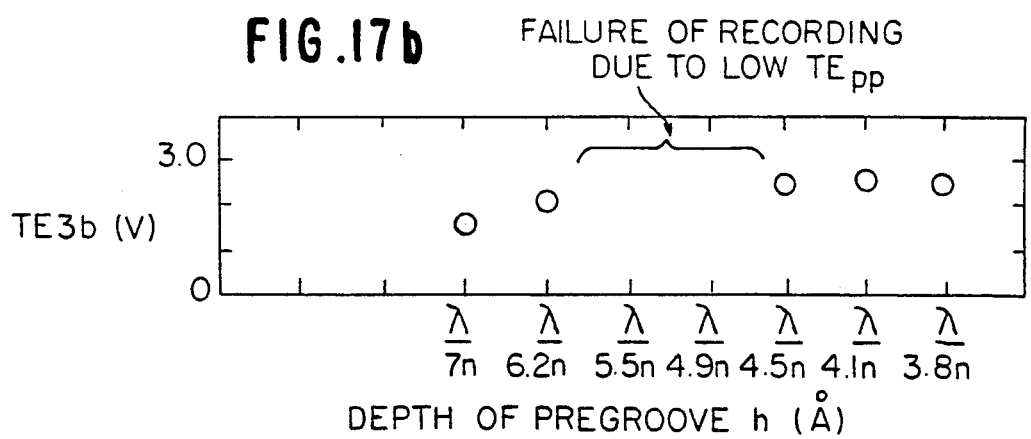

Samples 403 and 404 were prepared in the same manner as for Samples 401 and 402, respectively, except that the groove width (w) was fixed at 0.44 μm and the groove depth (h) was varied from λ/7.0 n to λ/3.8 n (Å), wherein λ is a wavelength (nm) of recording and reproducing light and n is a refractive index of the substrate. The samples were tested under the same conditions as described above. The results of Sample 403 (containing [Q-2-1]) are shown in FIGS. 14a through 17a, and those of Sample 404 (containing [Q-2-4]) in FIGS. 14b through 17b. FIGS. 14a and 14b are plots of $I_1$ and $I_g$ ($I_1$ must be greater than $I_g$); FIGS. 15a and 15b are plots of $TE_{pp}$; FIGS. 16a and 16b are plots of $I_{top}$, $I_{11T}$, and $I_{3T}$; and FIGS. 17a and 17b are plots of $TE_{3b}$.

It is seen from FIGS. 14a,b through 17a,b that the groove depth satisfying all the above-described conditions (1) to (4) falls within a range of from λ/4.5 n to λ/3.8, with the groove width (w) being fixed at 0.44 μm.

The same test was conducted while varying the groove width from 0.35 to 0.47 μm. As a result, it was confirmed that satisfactory results are obtained with a groove width ranging from λ/6.5 n to λ/2.5 n.

As described and demonstrated above, the present invention provides a recording medium having reduced jitter, improved performance on repeated reproduction, and improved light resistance. Further, the recording sensitivity of the recording medium of the present invention can arbitrarily be controlled.

While the invention has been described in detail and with reference to specific examples thereof, it will be apparent to one skilled in the art that various changes and modifications can be made therein without departing from the spirit and scope thereof.

What is claimed is:

1. A recording medium comprising a light-transmitting substrate having formed on one side thereof pregrooves, a light-absorbing layer provided on the pregrooved side of said substrate, and a light-reflecting layer provided on said light-absorbing layer, wherein said light-absorbing layer contains:

(a) a first cyanine dye having an absorption band in a wavelength region of light for recording or reproduction, and which is represented by formula (I):

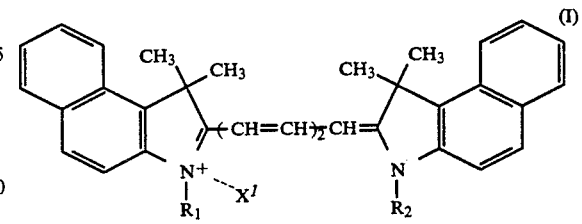

wherein $R^1$ and $R^2$ each represent an alkyl group having from 1 to 8 carbon atoms, and $X^-$ represents a counter ion, and (b) a second cyanine dye having an absorption band in a shorter wavelength region than that of said first cyanine dye and having a smaller absorption than that of said first cyanine dye in said wavelength region of light for recording or reproduction, and which is presented by formula (II):

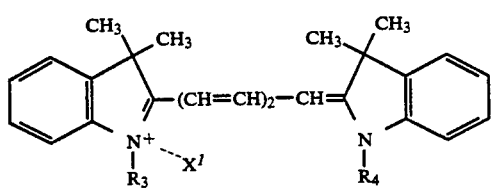

wherein $R^3$ and $R^4$ each represents an alkyl group having from 1 to 8 carbon atoms, and $X-$ has the same meaning as defined above, and (c) a first quencher effective to prevent photodeterioration of said first cyanine dye and said second cyanine dye of the following structure:

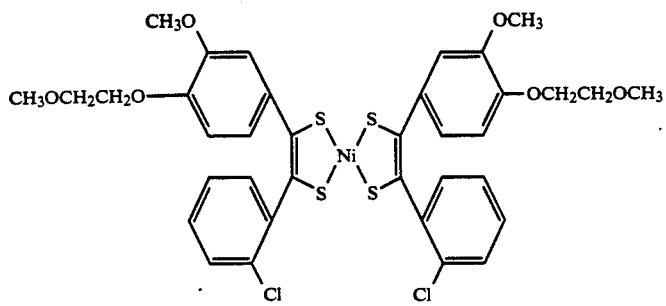

(d) a second quencher having the following structure:

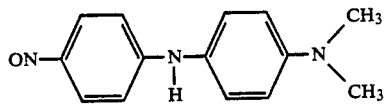

and wherein the weight ratio of the amount of said second cyanine dye to the amount of said first cyanine dye in said light-absorbing layer is designated $\alpha$ and has a value of from 1 to 3, and the weight ratio of the amount of said first quencher to the amount of said second quencher in said light absorbing layer is designated as $\delta$ and has a value of from 0.5 to 1, and the ratio of the total weight of said first quencher and said second quencher to the total weight of said first cyanine dye and said second cyanine dye is designated as $\gamma$ and has a value of from 0.25 to 0.5, and the product of $\alpha$ multiplied by $\gamma$ is a value of less than 1.1.

2. The recording medium as claimed in claim 1, wherein said pregrooves have a depth of from $\lambda/6.5$ n to $\lambda/2.5$ n, wherein $\lambda$ is a wavelength (nm) of light for recording or reproduction, and n is a refractive index of the substrate, and a width of from 0.35 to 0.47 μm.

* * * * *